US011280433B2

(12) United States Patent
Beele

(10) Patent No.: US 11,280,433 B2
(45) Date of Patent: Mar. 22, 2022

(54) SYSTEM FOR HOLDING IN A CONDUIT CABLES OR DUCTS WITH DIFFERENT DIAMETERS

(71) Applicant: Beele Engineering B.V., Aalten (NL)

(72) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 0 days.

(21) Appl. No.: 15/326,117

(22) PCT Filed: Sep. 10, 2015

(86) PCT No.: PCT/EP2015/070721
§ 371 (c)(1),
(2) Date: Jan. 13, 2017

(87) PCT Pub. No.: WO2016/009092
PCT Pub. Date: Jan. 21, 2016

(65) Prior Publication Data
US 2017/0198836 A1    Jul. 13, 2017

(30) Foreign Application Priority Data

Jul. 16, 2014 (NL) ..................................... 1040892

(51) Int. Cl.
*F16L 5/14* (2006.01)
*H02G 3/22* (2006.01)
(Continued)

(52) U.S. Cl.
CPC ............... *F16L 5/14* (2013.01); *F16L 3/2235* (2013.01); *F16L 3/26* (2013.01); *F16L 5/04* (2013.01);
(Continued)

(58) Field of Classification Search
USPC .............. 248/49, 56, 57; 174/650, 151, 135, 174/152 G, 153 G, 152 R, 659, 644, 137
See application file for complete search history.

(56) References Cited

U.S. PATENT DOCUMENTS 2,683,578 A * 7/1954 Challenor ............ H01B 17/306
174/146
2,732,226 A * 1/1956 Brattberg ................. H02G 3/22
248/56
(Continued)

FOREIGN PATENT DOCUMENTS

CN      102292587 A    12/2011
DE        9305975 U1     8/1993
(Continued)

OTHER PUBLICATIONS

U.S. Appl. No. 14/602,432, filed Jan. 22, 2015, Beele.
(Continued)

*Primary Examiner* — Alfred J Wujciak
(74) *Attorney, Agent, or Firm* — Wolf, Greenfield & Sacks, P.C.

(57) ABSTRACT

A system for holding in a conduit (7) cables and/or ducts with different diameters, comprising a plurality of rubbery or rubberlike sleeves (1) for inserting in such a conduit (7), the plurality of sleeves (1) comprising a number of units (2) of bonded sleeves (1) which are oriented parallel to each other, wherein within each unit (2) the sleeves (1) have corresponding outer dimensions, and wherein at least one unit (2) has a sleeve (1) having an inner diameter which differs from an inner diameter of a sleeve (1) of at least one other unit (2) of the number of units, wherein the number of the units (2) and the dimensions of the units (2) are such that therewith a stack of units can be made, in the stack of units (2) each sleeve (1) is also oriented parallel to any of the other sleeves (1), the stack of units having a rectangular shape of which
(Continued)

each side is in detail shaped by the presence of a number of the sleeves (1) and of which each edge is in detail shaped by the presence of one, two or three of the sleeves (1).

25 Claims, 20 Drawing Sheets

(51) Int. Cl.
| | | |
|---|---|---|
| *F16L 5/04* | (2006.01) | |
| *F16L 3/223* | (2006.01) | |
| *F16L 3/26* | (2006.01) | |
| *F16L 5/10* | (2006.01) | |
| *H02G 3/04* | (2006.01) | |

(52) U.S. Cl.
CPC .............. *F16L 5/10* (2013.01); *H02G 3/0412* (2013.01); *H02G 3/0456* (2013.01); *H02G 3/0481* (2013.01); *H02G 3/0487* (2013.01); *H02G 3/22* (2013.01)

(56) References Cited

U.S. PATENT DOCUMENTS

| | | | | |
|---|---|---|---|---|
| 3,489,440 | A * | 1/1970 | Brattberg | F16L 3/2235 403/192 |
| 3,695,563 | A * | 10/1972 | Evans | F16L 3/227 248/56 |
| 4,419,535 | A * | 12/1983 | O'Hara | H02G 3/22 169/48 |
| 4,702,444 | A * | 10/1987 | Beele | H02G 3/22 174/151 |
| 4,733,016 | A | 3/1988 | Twist et al. | |
| 4,888,374 | A * | 12/1989 | Takahashi | C08K 5/20 524/227 |
| 4,889,298 | A | 12/1989 | Hauff | |
| 4,919,372 | A * | 4/1990 | Twist | F16L 5/08 174/156 |
| 5,108,060 | A * | 4/1992 | Beele | H02G 3/22 248/56 |
| 5,783,776 | A | 7/1998 | Birmingham et al. | |
| 6,521,840 | B1 * | 2/2003 | Kreutz | H02G 3/22 138/109 |
| 8,598,472 | B2 | 12/2013 | Hildingsson | |
| 8,963,010 | B2 * | 2/2015 | Sprenger | H02G 3/083 174/151 |
| 9,464,734 | B2 * | 10/2016 | Okura | B60R 16/0215 |
| 9,464,735 | B2 * | 10/2016 | Masters | F16L 3/2235 |
| 2006/0217791 | A1 | 9/2006 | Spinka et al. | |
| 2012/0018960 | A1 | 1/2012 | Anderson et al. | |
| 2015/0001351 | A1 * | 1/2015 | Krager | H02G 3/32 248/49 |
| 2016/0018025 | A1 | 1/2016 | Beele | |

FOREIGN PATENT DOCUMENTS

| | | |
|---|---|---|
| DE | 10227098 A1 | 1/2004 |
| DE | 102005011286 B3 | 5/2006 |
| DE | 102005002879 A1 | 8/2006 |
| EP | 1 701 077 A2 | 9/2006 |
| FR | 2888512 A1 | 1/2007 |
| JP | 2000-355993 A | 12/2000 |
| JP | 2000355993 A * | 12/2000 |
| WO | WO 03/013658 A1 | 2/2003 |
| WO | WO 2008/104237 A1 | 9/2008 |
| WO | WO 2010/090582 A1 | 8/2010 |

OTHER PUBLICATIONS

PCT/EP2015/070721, Apr. 19, 2016, International Search Report and Written Opinion.
PCT/EP2015/070721, Oct. 21, 2016, International Preliminary Report on Patentability.
International Search Report and Written Opinion dated Apr. 19, 2016 in connection with International Application No. PCT/EP2015/070721.
International Preliminary Report on Patentability dated Oct. 21, 2016 in connection with International Application No. PCT/EP2015/070721.

* cited by examiner

4x30/24

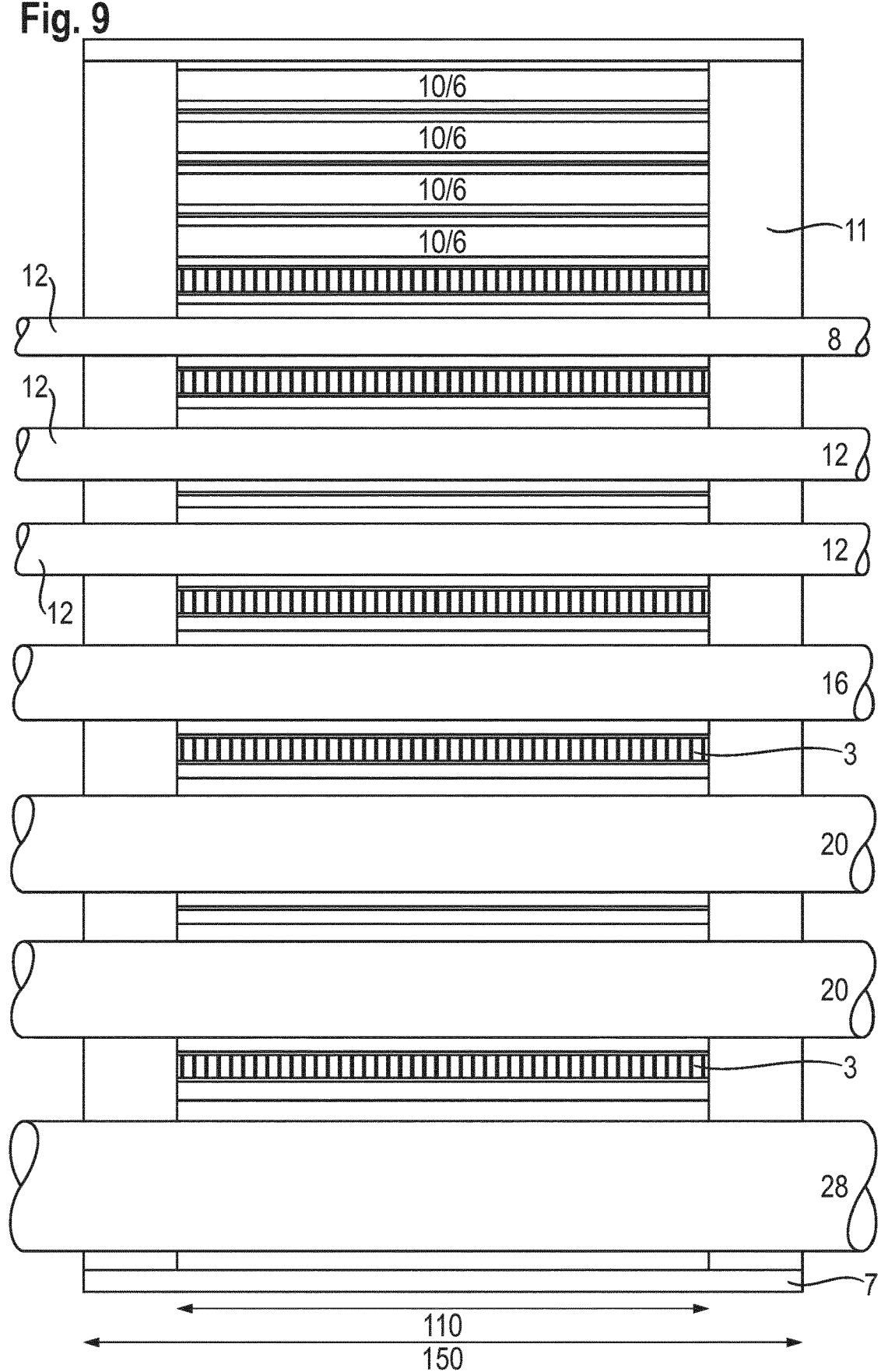

SYSTEM FOR HOLDING IN A CONDUIT CABLES OR DUCTS WITH DIFFERENT DIAMETERS

CROSS-REFERENCE TO RELATED APPLICATIONS

The present application is a National Stage filing under 35 U.S.C. § 371 of International Application No. PCT/EP2015/070721, filed Sep. 10, 2015, which claims priority to Netherlands Application No. 1040892, filed Jul. 16, 2014, both of which are incorporated herein by reference in their entireties.

The invention relates to a system for holding in a conduit cables or ducts with different diameters. Such systems are needed for sealing in a conduit the remaining space which surrounds cables that extend through that conduit. Such conduits can be found in all types of partitioning walls, for instance those separating one compartment from another or separating a compartment from outer atmospheric conditions. The conduit needs to be sealed off so as to ensure that for instance water or gas will not flow from one compartment to another, or into or out of a compartment. Ideally, the sealing is also resistant to heat, particularly generated by a nearby fire. Sealing systems are often rated in terms of their performance under predescribed "catastrophic" conditions.

Throughout this specification reference is most often made to cables. However, often the information given would equally apply if the cables are replaced by tubes, particularly those provided with a sheathing. These tubes and other tubes, particularly thin, and somewhat flexible pipes, are captured by the term ducts.

Hence, cables and ducts are considered interchangeable for the sake of describing and for applying the invention, unless specifically indicated otherwise Although on the one hand the sealing integrity should be optimal, particularly if and when the need arises (which could be many years after installation of the sealing system), the installation of the system itself should also be relatively fast (to save labor costs); unlikely to lead to installation faults; and leave the conduit after installation in a condition suitable for adding or removing cables without jeopardizing the integrity of the system placed in the conduit. Erroneously removing a cable could badly affect the operating of machinery which depends on the presence of these cables.

BACKGROUND OF THE INVENTION

A number of systems are well-known in the market place. One system is often referred to as the "block system". It was for instance installed on the Emma Maersk which according to the official accident report capsized in the Suez Canal in February, 2013, partly due to a failure of this block system. That system comprises modular blocks for placement in a conduit. A number of the blocks are provided with a hole for holding a cable. The blocks are built up from two half blocks, each having a recess that forms half the hole. There may also be wedge blocks with bolts, modular blocks without a hole for occupying surplus space in the conduit, and stay plates. The conduit may comprise a welded frame. The conduit, through which a number of cables of different diameters may extend, is filled up with the modular blocks (the blocks with a hole for a cable and the blocks without such a hole). The wedged blocks are normally put between these modular blocks with the aim to make the construction of the modular blocks tight and firm. The stay plates are fitted with layers of these blocks and aim to keep these blocks in the right position in the welded frame. As explained in the accident report the system failed on at least an individual component level.

The presently presented invention is based on the view that solving these problems requires a fundamentally different system. Importantly, such a different system is free from the need to compress the blocks after positioning in the welded frame, i.e. in the conduit. This is because compressing the components will, in the long run, result in deterioration of these components, due to time-related phenomena like creep and stress relaxation. Deterioration not only occurs on the level of the components, but also on the level of the sheathing of the cables. These can be irreversibly deformed by the applied compression of the blocks surrounding a cable. As a result of this, replacing an existing sealing system by a similar sealing system comprising blocks having a hole, is highly unlikely to work well as the diameter of the cable may have changed.

In line with this, now reference is also made to IEC 60079-14 (latest edition), particularly clause 9.1.4 which states that: "The connection of cables and conduits to the electrical apparatus shall be made in accordance with the requirements of the relevant type of protection". It is indicated that "care should be taken when selecting a suitable cable entry device in conjunction with certain types of cable employing materials which can exhibit "cold flow characteristics". The standard states by way of example that "cable entry devices not employing compression seals which act upon part(s) of the cable having cold flow characteristics" should be employed. The latest standard also states that "Low smoke and/or fire resistant cables usually exhibit cold flow characteristics" and that "cold flow can be more fully described as thermoplastic materials which flow when subjected to pressure at ambient temperature".

Clearly, the block system, if employed, requires careful placement and balancing of the compression at the time of installation, making the system open to installation faults. There is no way of controlling the compression and it is likely that too much compression will be applied. Even when perfectly installed, if possible at all, the deterioration will, as explained above, immediately start and in the long run lead to an unreliable sealing system.

Apart from these fundamental problems with the block system, there are also practical problems related to the planning of the way the conduit should be fitted and the carrying out of that planning. A configuration of the cables and the blocks would have to be designed beforehand, and will depend on the number of cables and the diameter of the various cables. The block system can only be applied when the cables have been drawn through the conduit. In practice, it is often the case that unexpectedly a larger cable is drawn through the conduit. Then another, larger block may need to be applied, disturbing the configuration as planned, as well as the compression pattern, as originally aimed for.

WO 03/013658 A1 describes an alternative system comprising sleeves of a fire-resistant material and a sealant. The system comprises single sleeves each having a longitudinal slit which allows for placing of the sleeve around a cable which already extends through a conduit. For swiftly filling up the remaining space in the conduit, the system may also comprise units of bonded sleeves. As explained in WO 03/013658 A1, sleeves of those bonded units do not have a slit extending over the length of the sleeve. A problem of this system is that in practice, the positioning of the sleeves within the conduit tends to be random, particularly when differently sized cables and differently sized sleeves are applied. When a large number of cables extend through a conduit, the result, in the end, tends to look like an unorganized passing of cables through a sealed conduit. It does not allow for easily recording a position in the conduit for each and every cable. This makes replacement of an existing cable by a new cable difficult, particularly in a situation where most of the cables look the same.

OBJECT OF THE INVENTION

It is an object of the invention to provide a system which allows for holding in a conduit cables of different diameters in a relatively easily recordable fashion.

It is another object of the invention to preferably also provide a system which can relatively quickly be installed, and such that the cable positioning is easily recordable also in a situation wherein cables already extend through a conduit before the system is placed in the conduit.

It is another object of the invention to preferably also provide a system that is substantially free from applying compression onto the cables, at most applies only a minimal compression.

It is another object of the invention to preferably also provide a system of the installation that can be easily adapted on the spot if unexpectedly a cable with a larger diameter extends through the conduit.

It is another object of the invention to provide a system which is an alternative to systems known from the prior art.

SUMMARY OF THE INVENTION

To meet at least one of the objects of the invention, the invention provides for a system for holding in a conduit cables and/or ducts with different diameters. The system comprises a plurality of rubbery or rubber-like sleeves for inserting in such a conduit. The plurality of sleeves comprises a number of units of bonded sleeves which are oriented parallel to each other. Within each unit the sleeves have corresponding outer diameters. At least one unit has a sleeve having an inner diameter which differs from an inner diameter of a sleeve of at least one other unit of the number of units. The number of the units and the dimension of the units are such that therewith a stack of units can be made. In that stack of units each sleeve is oriented parallel to any of the other sleeves. The stack of units has a rectangular shape of which each side is in detail shaped by the presence of a number of the sleeves and of which each edge is in detail shaped by the presence of one, two or three of the sleeves.

Advantageously, the position of each sleeve can accurately be recorded, for instance in terms of coordinates related to an orthogonal coordination system having one axis coinciding with one side of the rectangular shape and another axis coinciding with another side of the rectangular shape of the stack of units.

Furthermore, the system can be installed in a conduit by placing unit by unit, instead of now and again a single sleeve, then a unit of sleeves and then again a few single sleeves, etc. No additional compression is to be applied onto the system. The cables are not subjected to undesired forces. Should unexpectedly a cable have a larger diameter than was foreseen, then this cable can still be accommodated for without jeopardizing the entire structure of sleeves. A sleeve as present could cope with the larger cables. The inner diameter of the sleeves is not chosen to be snugly fitting around the cable. The cable is pulled through the sleeve so that each inner diameter will need to be oversized. Further, it is always possible to slit open a sleeve and apply the sleeve around the cable.

In an embodiment each sleeve is free from sealing properties for cables. Sealing properties comprise in this context features that allow for accommodating in the sleeve in a snugly fitting fashion a cable having a slightly oversized outer diameter (as compared to the inner diameter of the sleeves). Being free from sealing properties is ideally taken as far as facilitating sliding of a cable through a sleeve. Not only a relatively low friction inner surface of a sleeve assists in sliding, but also an over-dimensioned sleeve assists in sliding. Further, as will also be explained later, air in an occupied sleeve forms a thermal barrier and provides space for "anchoring" sealant should this be applied against a stack of the units for sealing of a conduit in which the stack, holding cables, is positioned. More particularly, each sleeve is free from inner ribs that could provide annular sealing rings in contact with an outer surface of a cable.

In an embodiment, each unit is made of a rubbery or rubber-like material having a hardness in the range of 68 to 76 Shore A. Such a hardness ensures that the unit is relatively stiff, that it will maintain its shape, also if the unit is holding a number of heavy cables, and also when the unit is at the bottom of a stack of such units which are each holding heavy cables. The diameters of the sleeves will under no circumstances significantly change, which is also important for ensuring that relatively little contact will exist between a cable held through a sleeve and the material of the unit. Should a cable be transporting heat into the conduit, then such heat is unlikely to be swiftly shared with material of the unit, as little contact exists between the cable and the unit. The air surrounding the cable will act as a thermal barrier. The heat introduced by the cable into the conduit, is very likely to be equally conducted out of the conduit straightforwardly via the cable that had introduced heat in the first place. Furthermore, maintaining the shape of the sleeve will ensure that in case a sealant is applied, the sealant can enter a space in the sleeve that is not occupied by the cable. Such entering of the sealant allows for improved fixation of the sealant by form-fitting as well as a form of adhesive fixation. The stiffness of the unit prevents the adhering surfaces from flexing too much, so that the adhering surfaces are unlikely to loosen up.

In an embodiment, each of the units has between each inner diameter of the sleeves and outer dimensions of the unit a continuous and constant material structure. This also contributes to having a unit that has predictability as to its mechanical performance. There are no hidden weaknesses.

In an embodiment, each sleeve is free from peelable inner layers. Consequently, the inner diameter of the sleeve is pre-fixed. This allows for properly organizing cables extending through a conduit. Units having sleeves with relatively small inner diameters can be positioned high up in a stack of units, without the concern that, for instance, later on a heavier thick cable will be pulled through a sleeve of which the inner diameter has been enlarged by removing peelable layers. This guarantees long term stability, and robustness against changes in cables.

In an embodiment, each of the inner number of units is a single part entity. This not only allows for efficient and straightforward management of stock of units etc., it also ensures that the dimensions of the units are well-defined, and not dependent on how multiple parts are positioned relative to each other. It also contributes to the aim to have the sleeves not snugly fitting around the cable but to have space around the cable once put through the sleeve. Parts cannot be squeezed to each other so as to snugly fit round a cable.

In an embodiment, each of the number of units is made of a homogeneous material. This also allows for easy manufacturing, for instance by injection molding, preferably by one shot. Preferably the material is a silicon-based rubber as this offers long-term stability of the material properties.

Preferably, in each unit, the lengths of the sleeves correspond to each other. This enhances stability of the stack of units and, in case the sleeves are designed to respond in case of a nearby fire, such a response will optimally take place within a conduit in which the stack has been installed. The rectangular stack will then be a block-shaped stack. If the rectangular stack will be a square stack, then the stack can also be cube-shaped, depending on the length of the sleeves.

Preferably, in each unit, the sleeves are all positioned in one layer of the sleeves. Advantageously, this provides for flexibility in the building up of the stack of units and in the diameters of the sleeves available in a conduit. In this way, for almost each "composition" of a bundle of cables extending through a conduit, it will be possible to provide a suitable stack of units for holding in that conduit each and every cable, independent of the number and diameter.

However, in an alternative embodiment at least one unit has layers of sleeves.

Preferably, each unit has, apart from the height of the one or more layers, dimensions which correspond to the dimensions of any of the other units. This makes composing the stack of units straightforward and allows it also to be planned in advance, so that installation of the system can be carried out straightforwardly. Instead of, or in addition to, the recording of the position of sleeves and thus also of certain cables in the conduit, it will, in the case where cables still have to be drawn, also be possible to design and control in advance a pattern according to which the cables should be positioned in the conduit. For instance, heavy cables could be positioned at a lower position in the conduit as compared to the position at which lighter cables are positioned in the conduit.

In an embodiment, it applies to at least one, and preferably to each unit, that the inner diameter of each sleeve is the same as the inner diameter for any other sleeve in that unit. This enhances the earlier mentioned recordability, the stability of the stack and has advantages for making an organized conduit through which many cables extend.

In an embodiment, the system further comprises at least one plate for placing in the stack of units between two units, for providing at least one surface against which at least one of the units can be positioned. Any "waviness" available on a side of a unit onto which another unit should be placed, will due to the presence of such a plate no longer have an effect on the way the upper unit will be supported and thus be positioned. Such an embodiment of a system according to the invention will allow for a very well organized, and very accurate, positioning of the sleeves and the respective cables in the conduit.

In a more detailed embodiment of such a system according to the invention, at least one plate is at each of two oppositely positioned rims provided with a number of ribs for facilitating insertion of the plate in a conduit in which the plate is positioned in a clamped fashion. Advantageously, the plates can further impose a pattern, and/or further stabilize a pattern, of the units of sleeves.

In an embodiment of a system according to the invention at least one sleeve of at least one unit is provided with a slit extending over a full length of the sleeve for placement of a cable into a sleeve via the slit and by moving a cable and that sleeve relative to each other laterally toward a coaxial position. Such a sleeve provided with a slit can easily be applied in a conduit through which a cable already extends. This is particularly useful when a previous sealing system has to be removed for instance because of its reduced sealing integrity or because a number of additional cables will have to be pulled through the conduit. Note that in case a system according to the invention itself is already used in a conduit, pulling new cables through the conduit can take place without having to remove the earlier installed sleeves. All that needs to be present is the availability of sleeves through which as yet no cable extends.

It is possible that in at least one unit a number of adjacent sleeves are provided with such a slit. This facilitates application of such a unit where a number of cables extend, or are meant to extend closely to each other through the conduit. Then, advantageously, each cable can occupy one sleeve of the unit, so that the cables remain close to each other but are still positioned in an easily recordable pattern.

More preferable is that at least one of the slits is shared by two neighboring sleeves of which one has two slits. It is for instance possible that of the sleeve which has two slits, one of the two slits is shared with a neighboring sleeve and the other one of the two slits is positioned opposite the slit which is shared with a neighboring sleeve. This allows for using one slit for letting a cable first enter one sleeve from which it can be moved over to the next sleeve. This is particularly useful when two cables extend closely parallel to each other, for instance when tie-wrapped. It allows for placing one cable in one of these neighboring sleeves and the other cable in the other one of these neighboring sleeves.

In an embodiment of a system according to the invention, the sleeves may have a cross-section which is circular. This allows for some self-clamping of the units in a conduit.

As an alternative it is possible that at least one of the units has on its outside a flat surface which extends in a length direction of the sleeves and which extends in a layer direction of the sleeves in the unit. It is thus possible that in a unit each of the sleeves is considered to be block-shaped. At least one of the units may thus have a block-shaped outer shape. This facilitates stacking of the units and an even more accurate positioning of the sleeves in the conduit so that the recordability and/or planning of the patterning of cables in the conduit can be more accurate.

An embodiment of a system according to the invention may also comprise at least one single sleeve having an outer cross-sectional dimension suitable for inserting the at least one single sleeve in another sleeve of the system. Accordingly, the stability of the system as assembled in a conduit can be enhanced, which may be necessary when for instance upper units are provided with heavy cables and lower units are momentarily kept empty, i.e. free from cables. In case the sleeves are made of a thermally expandable rubber-like material, insertion of such a single sleeve in a sleeve of a unit ensures that enough expandable material is present in the system as assembled into a stack of units.

In an embodiment of a system according to the invention, the sleeves are made of a thermally expandable rubber-like material. The term rubber-like is used to express that the rubber-like material may be vulcanizable and perhaps already partly vulcanized. The term thermally expandable is used to express that the material comprises one or more components which will on exposure to heat cause the material to expand to a larger extent than it would do without the presence of these components.

In another embodiment of a system according to the invention, the sleeves are made of a vulcanized thermally substantially un-expandable rubbery material. The term thermally substantially un-expandable is used to express that the material is free from components which would on exposure to heat cause the material to expand to a larger extent than it would do without the presence of these components.

In case the system comprises at least one plate, then that at least one plate may be made of a thermally expandable rubber-like material Or vulcanized thermally substantially un-expandable rubbery material, and is by construction or by material properties stiffer than the stiffness of any one of the units of sleeves as formed by a single layer of sleeves. Accordingly, it is possible to provide the system without dissimilar materials and thus without the chance of undesired interaction between the materials used for the conduit and the sleeves and/or plates. Such an undesired interaction could for instance be corrosion, in the case where the conduit and a plate are made of different metals.

In an embodiment of a system according to the invention, the system may further comprise a conduit into which the stack of units can be assembled such that it snugly fits in the conduit. This will ensure that the dimensions of the conduit and the dimensions of the stack of units will be set to have optimal functioning of the system during installation and afterwards.

In an embodiment of a system according to the invention, the system further comprises a sealant for application against the stack of units at the ends of the sleeves when the stack is completed in a conduit and cables are held by a number of the sleeves.

The invention further provides a unit of a number of bonded sleeves for holding cables or ducts in a conduit. The sleeves are of a rubbery or rubber-like material. The sleeves are oriented parallel to each other, and the sleeves are all positioned in one layer of the sleeves. At least one sleeve is provided with a slit extending over a full length of that sleeve for placement of a cable or duct into that sleeve via the slit by moving a cable or duct and that sleeve relative to each other laterally toward a coaxial position.

The invention further provides a sleeve for holding cables or ducts in a conduit. The sleeves are of a rubbery or rubber-like material, the sleeve having a plurality of lumens which are oriented parallel to each other.

The invention further provides a unit of a number of such sleeves.

The invention, and the embodiments thereof, will further be explained in more detail with reference to a drawing in which:

FIG. 9 shows schematically an embodiment of a system according to the invention;

In the drawing and the following description thereof, like parts are denoted by like reference signs. The embodiments which are now discussed only concern examples of the invention and are not to be understood as limiting the invention unless clearly specified otherwise.

Figure 1:
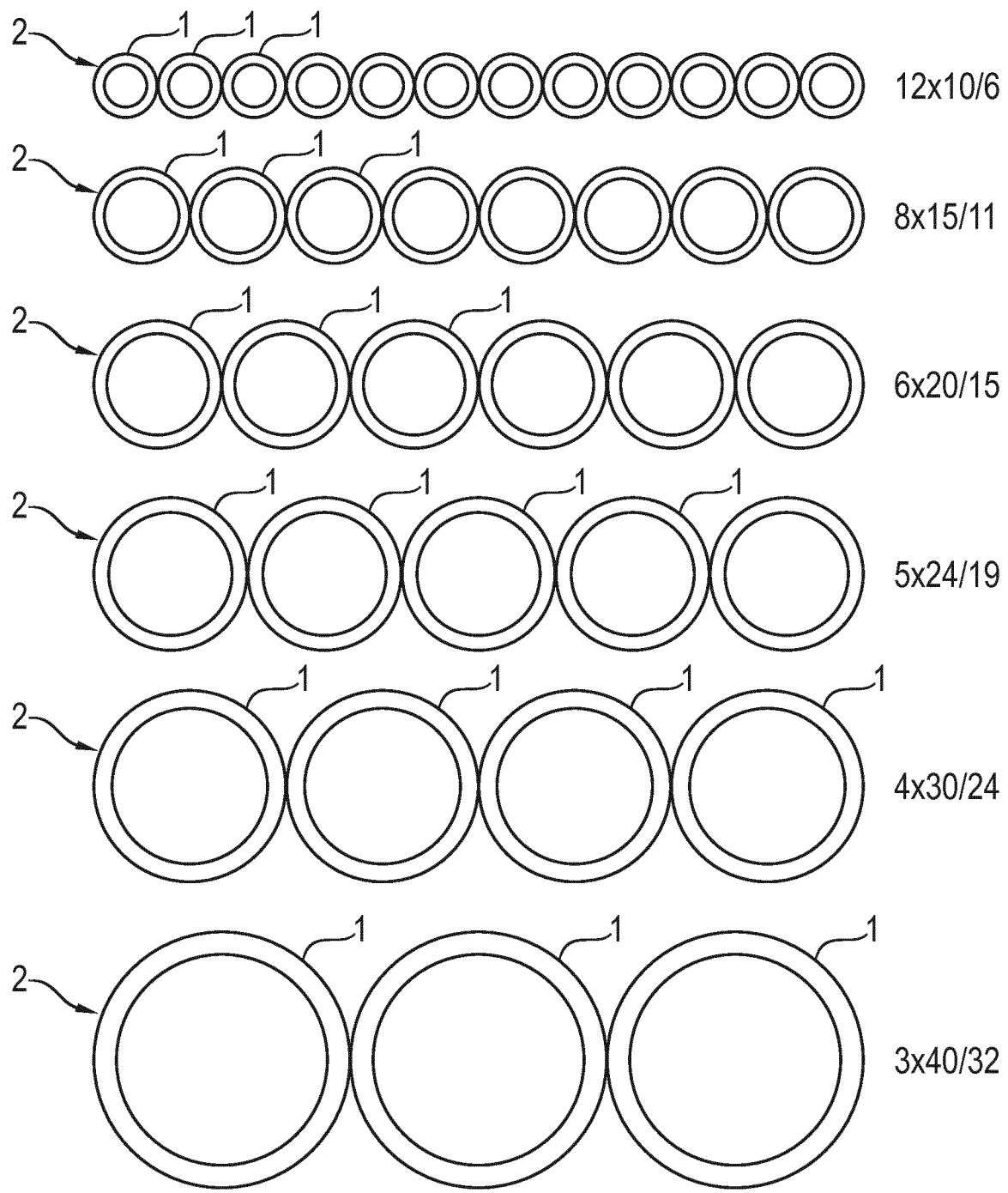
FIG. 1 shows schematically an embodiment of a system according to the invention.

FIG. 1 shows schematically a system for holding in a conduit cables with different diameters. The system comprises a plurality of rubbery or rubber-like sleeves 1 for inserting in such a conduit. The plurality of sleeves 1 comprises a number of units 2 of bonded sleeves 1 which are oriented parallel to each other. In FIG. 1, and in many other figures, only the cross-section of the sleeves 1 is shown.

Figure 3:
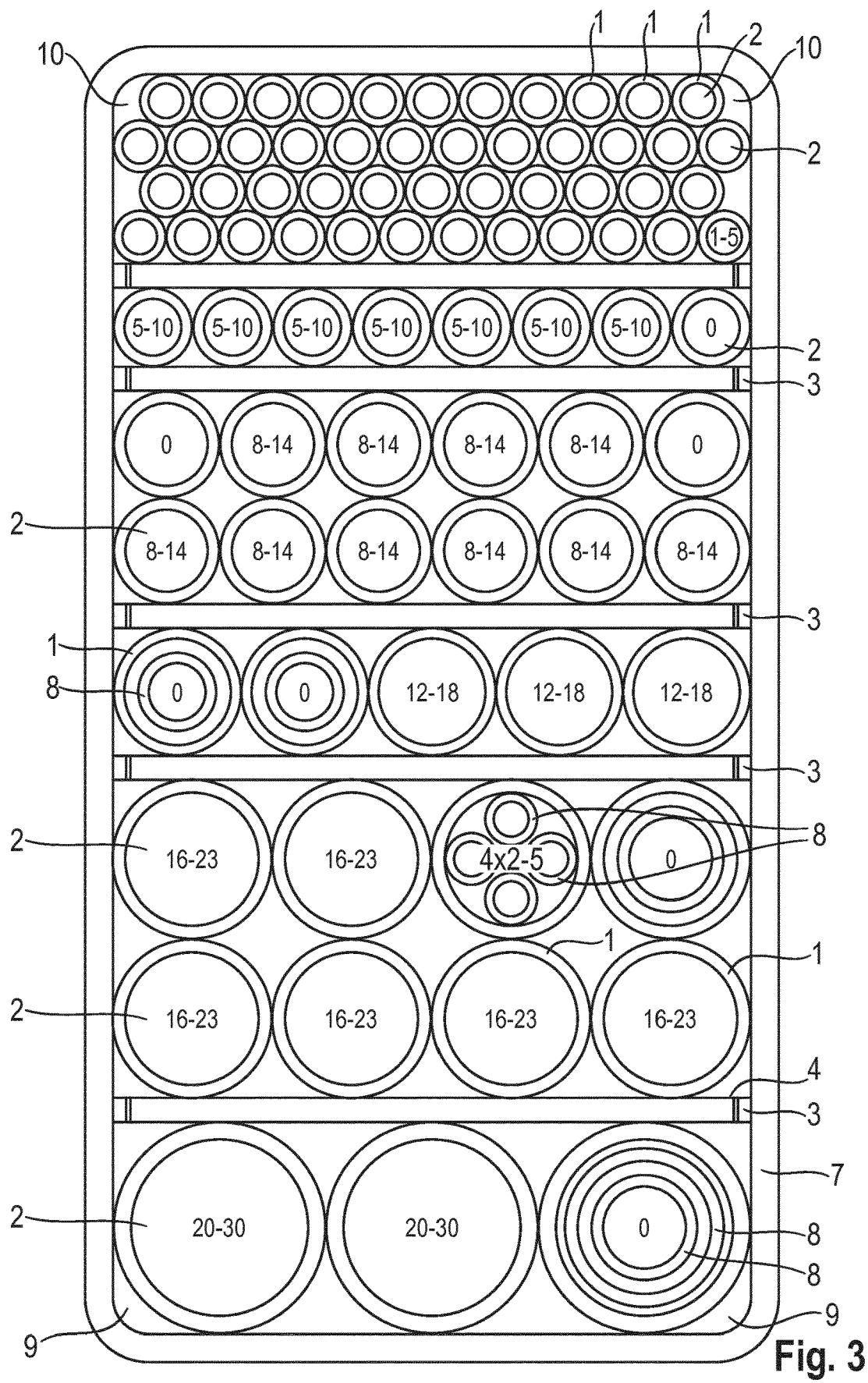
FIG. 3 shows schematically an embodiment of a system according to the invention.

Within each unit 2 the sleeves 1 have corresponding outer dimensions. The system shown in FIG. 1 comprises six units 2. Within each unit 2, the sleeves 1 have an inner diameter which differs from an inner diameter of the sleeves of at least one other unit 2 of the six units 2. As can be seen, the inner diameters of the sleeves of one unit 2 are preferably identical. However, it is not impossible that within one unit the sleeves have different inner diameters. In an embodiment of the invention, within one unit of sleeves, the sleeves have different inner diameters. As will be discussed later, in some embodiments at least one sleeve may be provided with multiple lumen. The latter may also be referred to as channels. Such a sleeve, and a unit of such sleeves, are also each considered to be an aspect of the invention. The number of the units 2 and the dimensions of the units 2 are such that therewith a stack of units 2 can be made. This possibility can easily be derived from FIG. 1. In the stack of units 2 each sleeve 1 is also oriented parallel to any of the other sleeves 1. The stack of units 2 can have a rectangular shape of which each side is in detail shaped by the presence of a number of the sleeves 1 and of which each edge is in detail shaped by the presence of one, two or three of the sleeves. This will be further explained when FIG. 3 is discussed.

FIG. 1 presents a very workable embodiment in that with only six different units 2 many sleeves of different diameters can be provided and a rectangular stack of units can be made. The possible number of sleeves and the possible inner and outer dimensions of these sleeves (in millimeters) are indicated next to the respective units 2.

Preferably, in each unit 2, the lengths of the sleeves 1 correspond to each other. In a preferred embodiment, in each unit 2, the sleeves 1 are all positioned in one layer of the sleeves 1, as also shown in FIG. 1. From reviewing FIG. 3 and FIGS. 5 and 6, (the latter two being perspectives onto embodiments of the system according to the invention in use, as seen from a direction perpendicular to the direction of the cables extending through the system), it will be clear that preferably also each unit has, apart from the height of the one layer, dimensions which correspond to dimensions of one of the other units.

An embodiment of a system according to the invention comprises at least one plate 3 for placing in the stack of units 2 between two units 2, for providing at least one surface 4 against which at least one of units 2 can be positioned. The plate 3 preferably has in two directions a dimension which corresponds to at least one of the dimensions of the stack of units 2. Assuming that the sleeves 1 shown in FIG. 1 have a length of 110 mm, it can be seen that a plate 3 shown in FIGS. 2a and 2b is in correspondence with this preference.

Figure 2A:
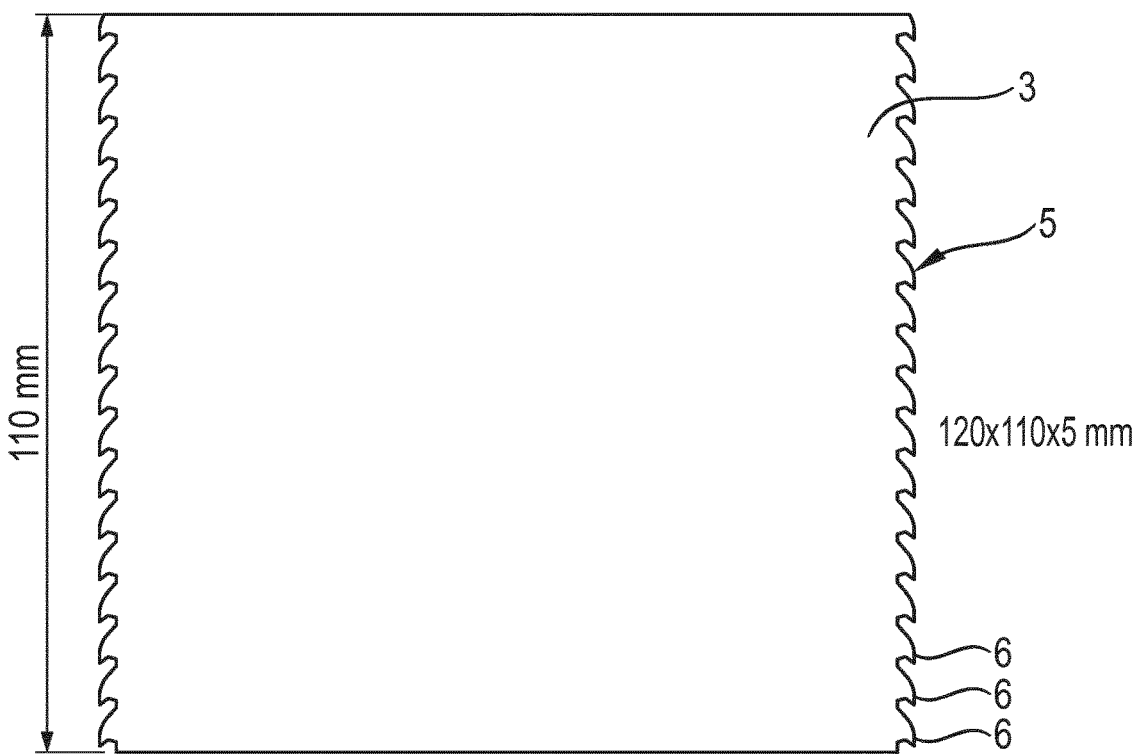
FIG. 2a shows schematically part of an embodiment of a system according to the invention.
Figure 2B:
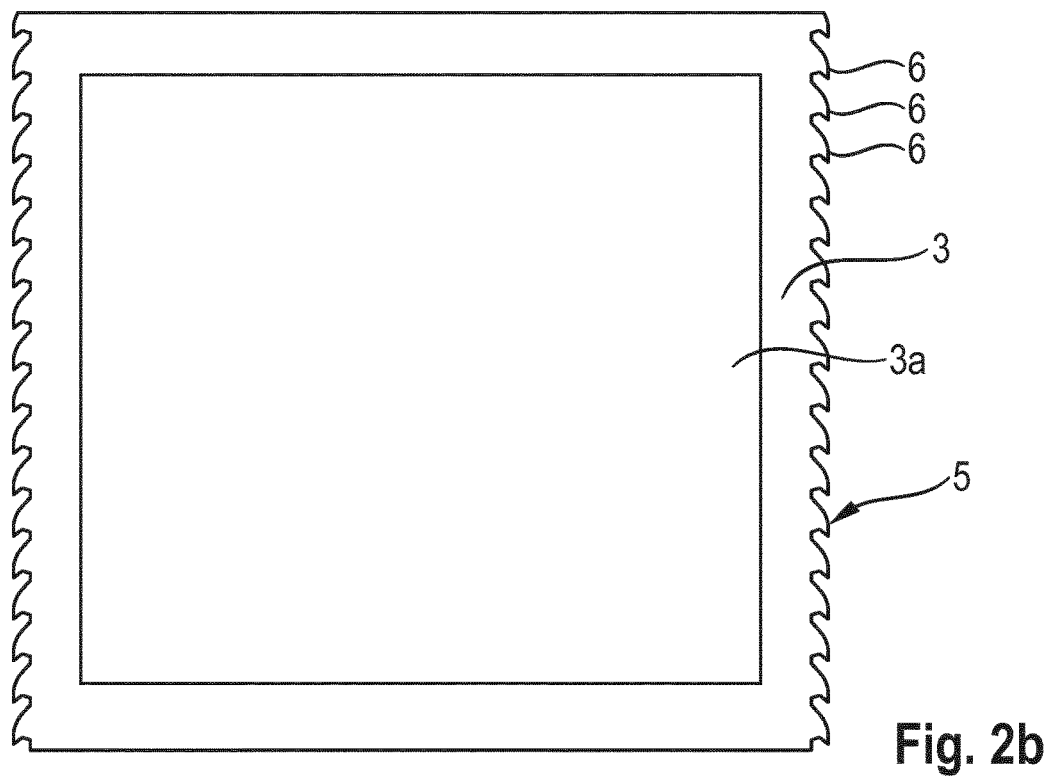
FIG. 2b shows schematically part of an embodiment of a system according to the invention.

Further, as shown in FIG. 2, the plate 3 has preferably at each of two oppositely positioned rims 5 a number of ribs 6 for facilitating insertion and clamping of the plate 3 in a conduit 7 (see FIG. 3). Such ribs 6 may for instance have the shape of a saw tooth. The plate 3 shown in FIGS. 2a and 2b is suitable for insertion in a direction within the plane of the plate 3. It is conceivable that the ribs have a shape which differs from the saw-tooth configuration. In FIG. 2b a plate 3 is shown as provided with a stiff plate 3a, for instance made of a hard plastic. This plate is suitable for an embodiment of a system that is intended to have many sleeves in a horizontal plane next to each other.

FIG. 3 shows schematically an embodiment of a system according to the invention, ready for use. In a conduit 7 the different units 2 are stacked to fill up the predominantly rectangularly-shaped conduit 7. The bottom corners 9 of the rectangularly-shaped stack of units 2 are in each of these bottom edges 9 in detail shaped by the presence of one sleeve 1. However, the two upper edges 10 of the rectangularly-shaped stack of units 2 are each in detail shaped by the presence of two sleeves 1 each belonging to a different unit 1. It is also conceivable that an edge of a predominantly rectangularly-shaped stack of units 2 is in detail shaped by the presence of three sleeves.

The embodiment shown in FIG. 3 is ready for use. That is, cables can be pulled through the respective sleeves 1. The numbers presented in the sleeves show the range of diameters of a cable that could be pulled through the respective sleeve 1. Where the number 0 is placed in the sleeve, this is to be taken as an instruction that according to a predetermined planning no cable should be pulled through that sleeve. Such an empty cable will remain available for adding cables through the conduit 7 later on, i.e. at a moment in time after installation of the system.

As can be seen, the embodiment shown in FIG. 3 also comprises single sleeves 8 having an outer cross-section or dimension for inserting at least one of these single sleeves 8 in another sleeve 1 of the system. In case the sleeves 1, 8 are made of a thermally expandable rubber-like material, insertion of such a single sleeve in the sleeve of a unit 2 ensures that enough expandable material is present in the system, so that the entire cavity provided by the larger sleeve will be closed off by the expandable material in case of a nearby fire.

In case the sleeves are made of a vulcanized thermally substantially unexpandable rubbery material, such a single sleeve 8 as inserted into a larger sleeve 1 will provide additional stability, stiffness and strength to the system, so that the rigidity of the system, and therewith the accurate recordability of positions of sleeves and cables will be maintained. As can be seen, also a number of single sleeves 8 can be inserted into a larger sleeve 1, surrounding each other (shown right under) or next to each other (shown more toward the middle of the conduit). For each of these embodiments it is also possible that the single sleeve is used for holding a cable extending through the conduit 7.

Figure 6A:
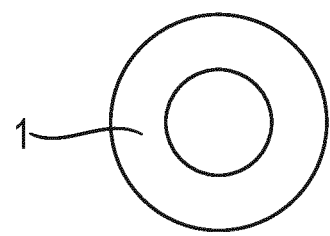
FIG. 6a shows schematically a part of an embodiment of a system according to the invention.
Figure 6B:
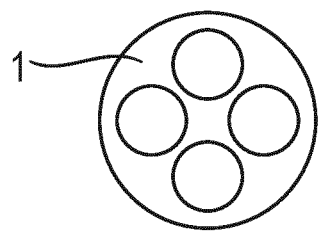
FIG. 6b shows schematically a part of an embodiment of a system according to the invention.

In addition, or as an alternative to the single sleeves discussed so far, it is also possible that the system comprises single sleeves having a cross-section as shown in FIGS. 6a and 6b. Such a thicker-walled sleeve as shown in FIG. 6b can be inserted in a sleeve having an inner diameter larger than the outer cross-sectional dimension of the thick-walled-sleeve. However, it is also envisaged that such a thick-walled sleeve replace a sleeve by tearing that sleeve out of the unit of which it was a part. The same possibilities for use apply to a multilumen sleeve as shown in FIG. 6b.

Clearly, through the embodiments shown in FIG. 3, cables can be pulled in line with and at a predetermined position in a composed pattern of sleeves 1. However, it is also possible to use the system in a conduit through which already cables extend. For that purpose, each sleeve can be slit open in a length direction using for instance a sharp knife so that the respective sleeve can be put around the respective cable. By imposing the system onto a bundle of cables already extending through a conduit, it will be possible to force the cables to adopt a position in pattern that is more easily recordable than and expressed in a systematic way than it was before the system was installed. As will now be discussed, the sleeves may also be provided with a pre-cut slit.

Figure 7:
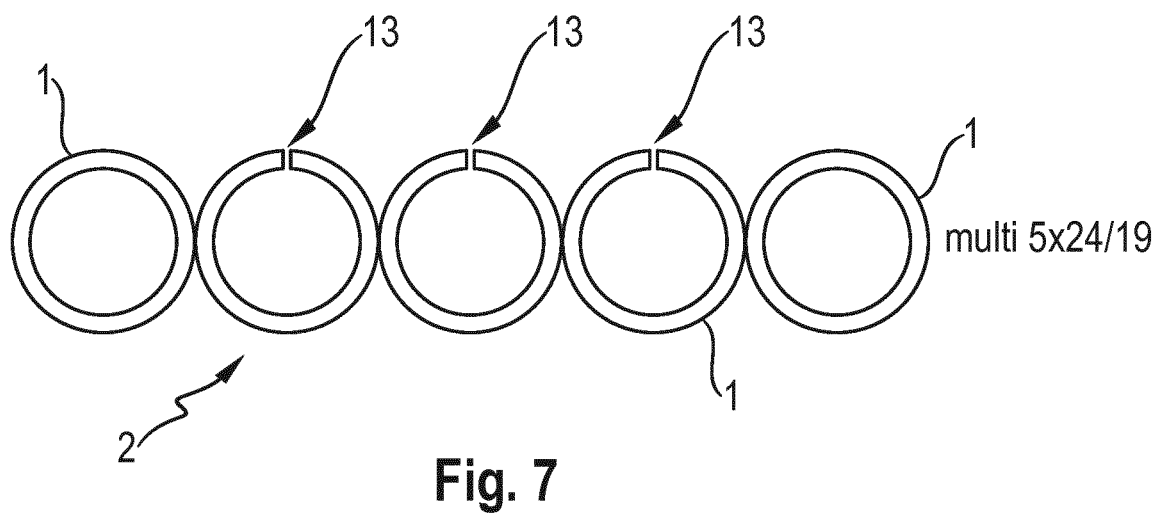
FIG. 7 shows schematically a part of an embodiment of a system according to the invention.
Figure 8A:
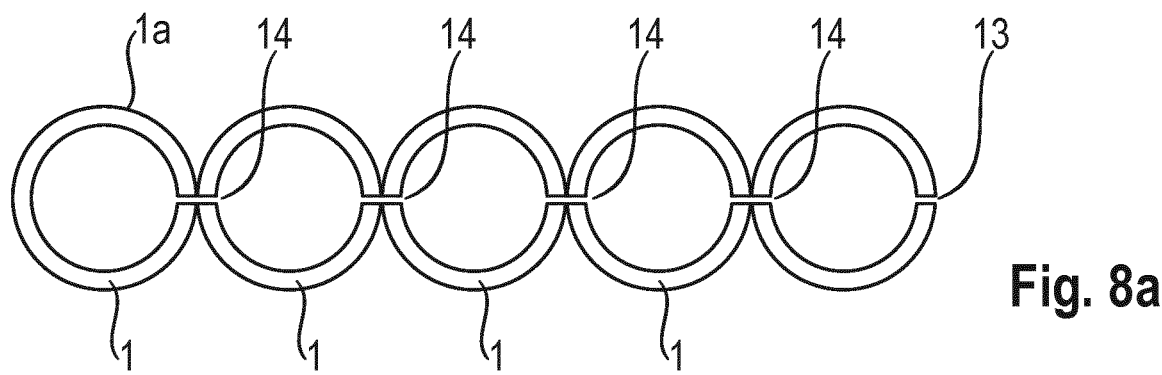
FIG. 8a shows schematically a part of an embodiment of a system according to the invention.
Figure 8B:
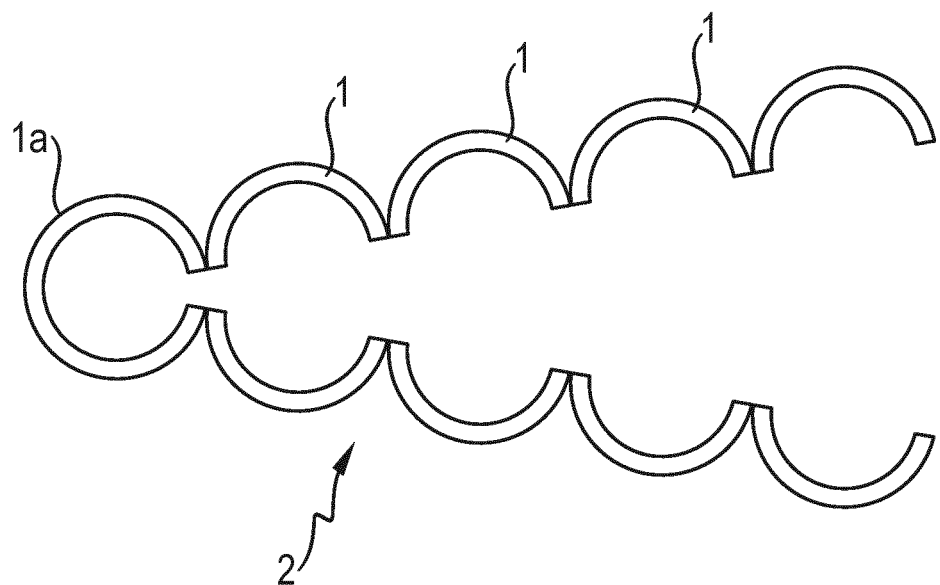
FIG. 8b shows schematically the part shown in FIG. 8a, in an opened position.

In embodiments of a system according to the invention, at least one sleeve 1 of at least one unit 2 is provided with a slit (see FIG. 7) extending over the full length of the sleeve 1 for placement of a cable into a sleeve 1 via the slit 13 by moving a cable and that sleeve 1 relative to each other laterally toward a coaxial position. For a number of adjacent sleeves 1 in one unit such a slit 13 may be provided. According to a further embodiment, such as for instance shown in FIGS. 8a and 8b, it is also possible that one slit 13 is shared by two neighboring sleeves 1 of which one has two slits. Of that sleeve 1 which has two slits 13, 14, one of the two slits 13, 14 may be shared with a neighboring sleeve 1 and the other one of the two slits may be positioned opposite the slit which is shared with a neighboring sleeve 1. It is possible that in one unit 2 all but one of the sleeves 1 are provided with two slits 13, 14 and that the one sleeve 1a without two slits 13, 14 only has a slit 13 which is being shared with a neighboring sleeve 1. The one sleeve 1a with only one slit 13 may be situated at the end of the unit 2 of sleeves 1. In such an embodiment it is possible that of all the sleeves 1, 1a of one unit 2 the upper halves can together be lifted up so that the distance between the upper halves and the lower halves of those sleeves 1, 1a is enhanced. The sleeve 1a with only one slit 13 then functions as a hinge. A bundle of cables can then be spread out over the sleeves 1, 1a of that unit 2, after which the upper halves of the respective sleeves 1, 1a can be put back on the lower halves, so that each cable is enclosed by a sleeve 1, 1a. A unit as shown in FIGS. 8a and 8b can also be employed outside the context of the system invented. A unit as shown in FIGS. 8a and 8b and described above is considered to be an aspect of the present invention.

As shown in FIGS. 1 and 3, the sleeves may have a cross-section which is circular. In such an embodiment, it is preferable to have the plates 3. Plates 3 have the function of providing a surface against which a unit 2 of sleeves 1 can be positioned, so that a layer of sleeves 1 will not adopt a somewhat buckled shape and negatively affect an accurate positioning of the respective sleeves. The upper surface 4 of plate 3 provides a suitable surface for support of a unit laying on top of it. The lower surface of plate 3 not necessarily makes contact with a unit 2 of sleeves 1.

Figure 4:
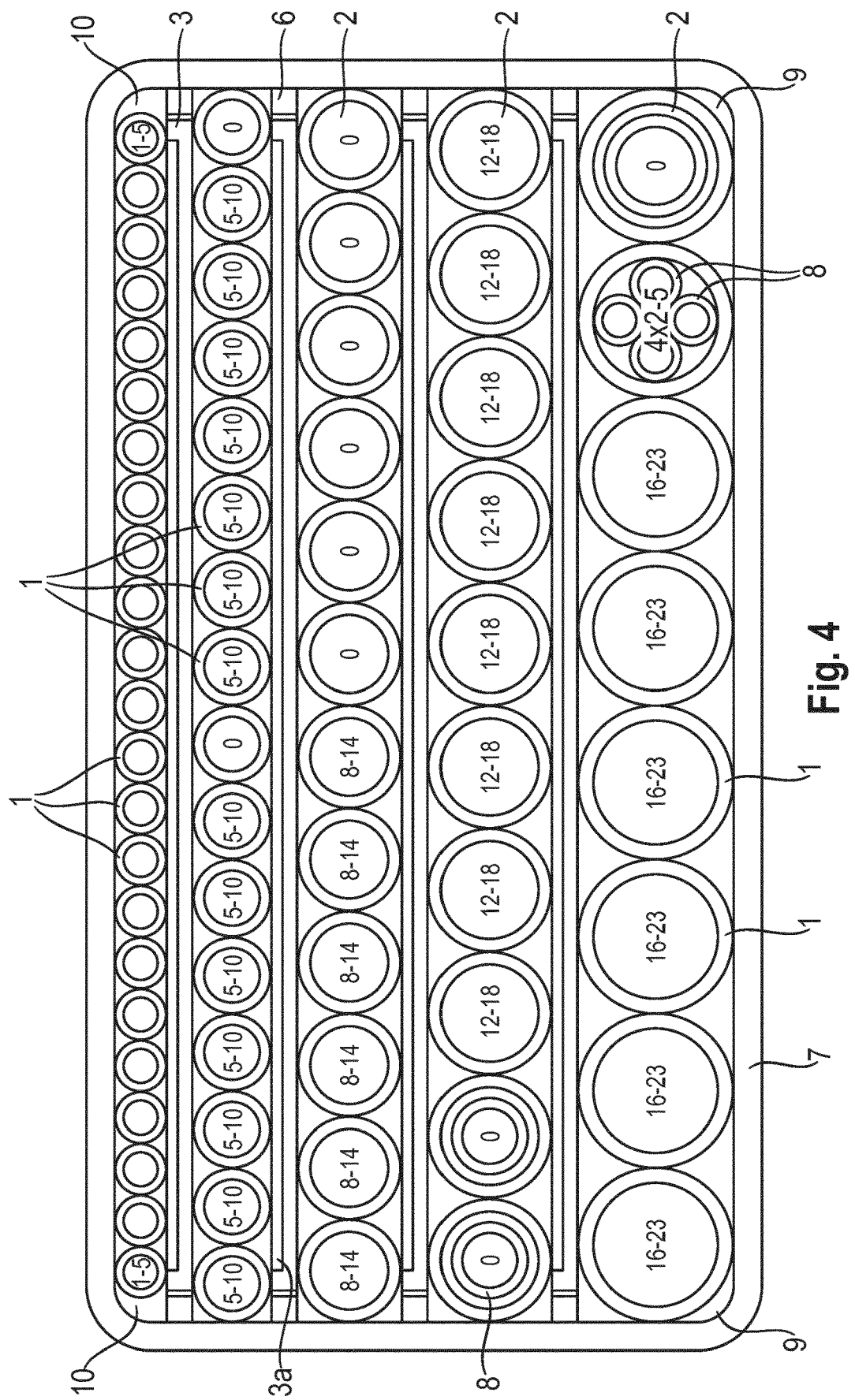
FIG. 4 shows schematically a an embodiment of a system according to the invention.

FIG. 4 shows another embodiment of a system according to the invention ready for use in the sense that cables can be pulled through. In this case, the width of the conduit is larger than the height. When cables are kept outside the conduit in a cable tray, then there is less need to allow for much slack in the cables, as the cables do not need to be fed into a sleeve 1 that is positioned much higher, or lower, than the cable tray. For this embodiment the plates 3 are preferably provided with a stiffer plate 3a.

We now discuss an embodiment of a system according to the invention that is particularly useful when, for whatever reason, preferably no plates 3 are used. Particularly in an embodiment wherein at least one of the units has on its outside a flat surface which extends in a length direction of the sleeves 1 and which extends in a layer direction of the sleeves in the respective unit 2, there may not be a need for having plates 3.

Figures 5A, 5B:
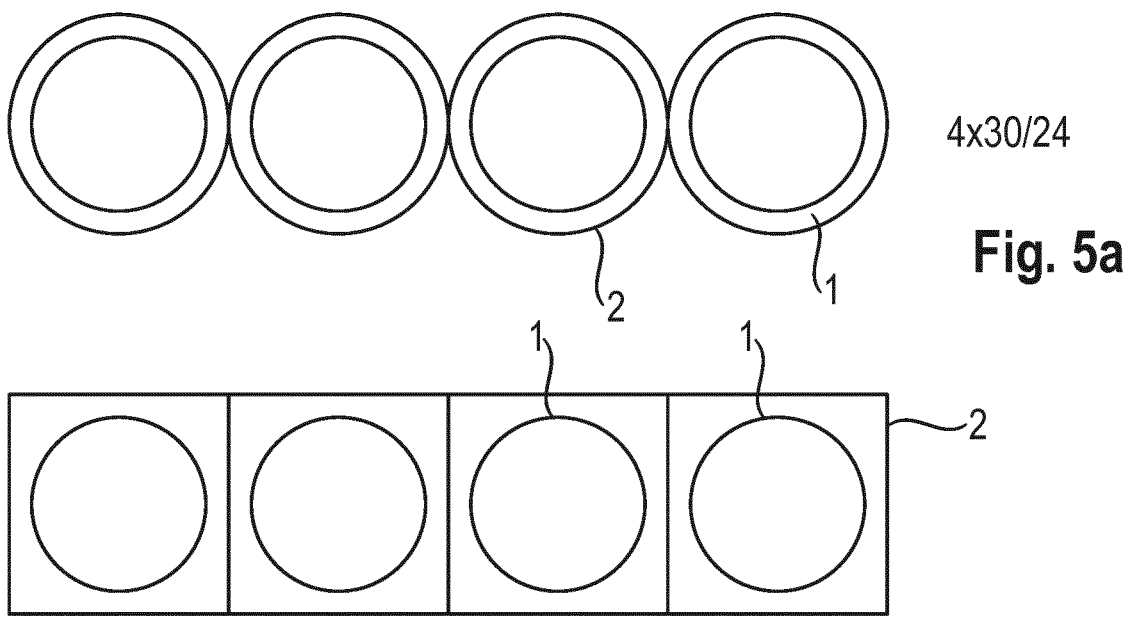
FIG. 5a shows schematically a part of an embodiment of a system according to the invention.
FIG. 5b shows schematically a part of an embodiment of a system according to the invention.

In an embodiment of a system according to the invention the unit may have a block-shaped outer shape, so that there may not at all be a need for a plate 3. For the sake of completeness, FIG. 5a shows a unit 2 having sleeves 1 with a circular cross-section and FIG. 5b shows a unit 2 having a block-shaped outer shape. Each sleeve 1 of that unit may be considered to have a block-shaped cross-section. The inner diameters of the sleeves 1 shown in FIG. 5a and FIG. 5b are identical.

In practice, cables extending through the system are unlikely to have a perfectly coaxial position relative to the respective sleeves 1. Only when the sleeve 1 has an inner diameter that corresponds to the outer diameter of the cable, such a coaxial configuration may be present. This may also be achieved when a sleeve 1 having a slightly smaller inner diameter is provided with a slit 13 and placed over a cable having a slightly larger diameter so that the slit 13 remains unclosed and present. However, in the other configurations, the sleeves 1 somewhat loosely hold the cable, having the advantage that no forces are exerted onto the cables so that the sheating is not being deformed. Another advantage is that the cables do not necessarily have to extend in a strictly straight line through the conduit 7. There is some flexibility in departing from such a straight line.

The stacked units of sleeves 1 provide a good structure against which a sealant 4 can be applied. For this purpose, an embodiment of a system according to the invention may comprise a sealant 11 for application against a stack of units 2 at the end of the sleeves 1 when the stack 2 is completed in a conduit 7 and cables 12 are held by a number of the sleeves 1. The sealant may only be such that the system becomes closed off for gas and water but also a special sealant may be applied in line with the nature of the material of which the sleeves are made.

For optimal dimensioning, a system according to the invention may further comprise a conduit 7 into which the stack of units 2 can be assembled such that it snugly fits in the conduit 7. This, however, does not mean that the length of the conduit 7 corresponds to the length of the sleeves 1. Ideally, the sleeves 1 are shorter than the length of the conduit 7, so that the sealant 11 can be applied against the ends of the sleeves 1 and still within conduit 7.

Although the sleeves 1 already provide a function of defining a predetermined cavity through which a particular cable can extend through the conduit 7, and as part of a stack snugly fitting in the conduit 7 provide a structure against which a sealant 11 can be applied, in an embodiment according to the invention, the sleeves 1 are made of a thermally expandable rubber-like material to further enhance the functionality of the sleeves 1. On exposure to heat reaching that material, either through the conduit 7, or through cables 12 extending through the conduit 7, this material will expand, therewith forming a complete closure of the conduit 7. This closure may be in addition to the sealant 11 which may only be functioning as a seal against water and gas before a nearby fire starts having an influence on the system.

Alternatively, the sleeves may be made of a vulcanized thermally substantially unexpandable rubbery material, then the sleeves are functioning as described in WO 08104237 A1.

If the system comprises one or more plates 2, then a plate may be made of a material that is similar to the material of which the sleeves are made. However, the plate is preferably by construction or by material properties stiffer than the stiffness of any one of the units of the sleeves that is formed by a single layer of sleeves.

Figure 10:
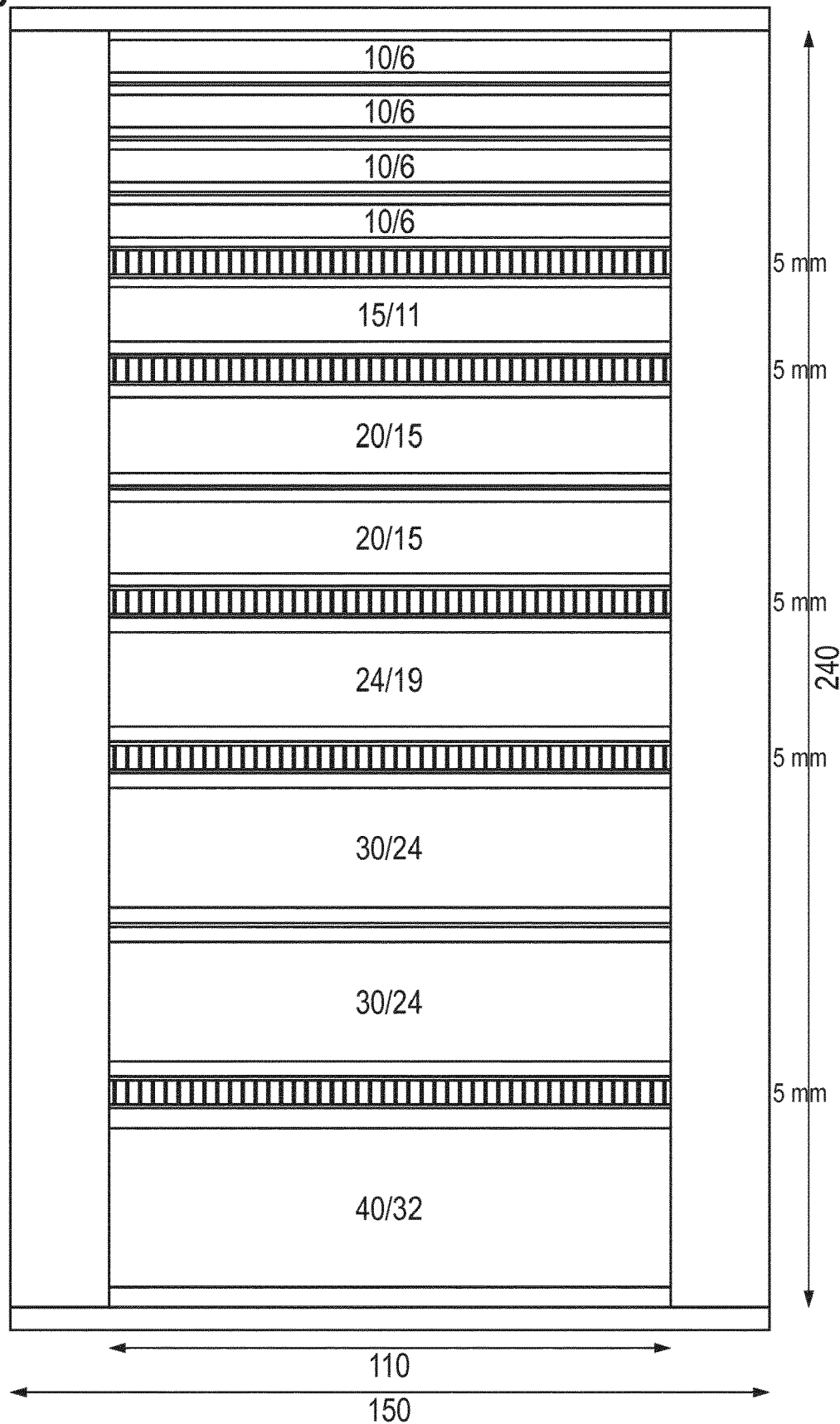
FIG. 10 shows schematically an embodiment of a system according to the invention.

FIGS. 9 and 10 provide further insights in possible examples of systems according to the invention. The dimensions provided are by no means intended to limit the invention or the use thereof, but do indicate possible dimensions for a very workable embodiment.

Figure 11:
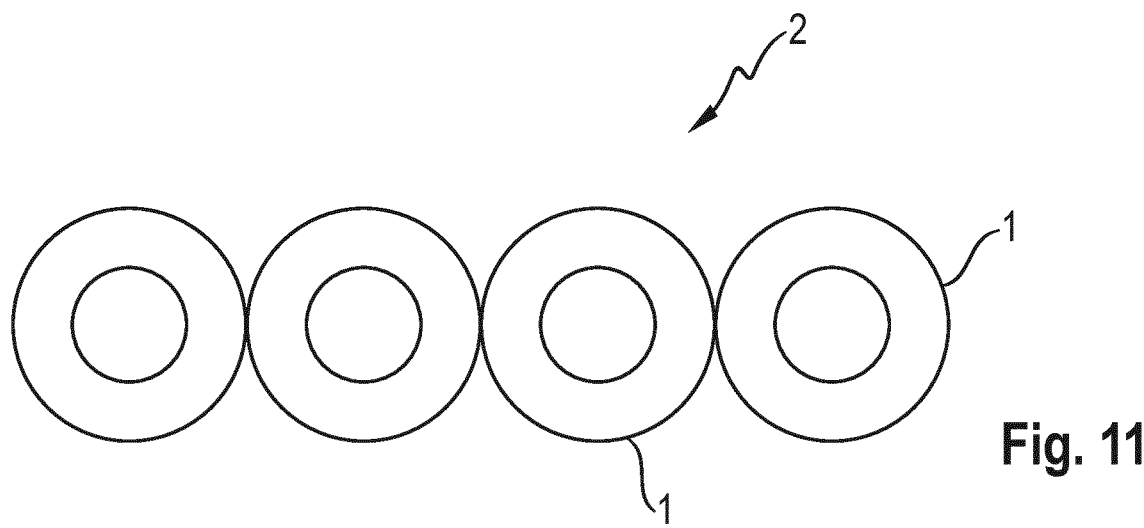
FIG. 11 shows schematically an embodiment of a system according to the invention.

FIG. 11 shows a unit 2, of which the sleeves 1 have relatively small inner diameter as compared to the outer diameter. This improves the stiffness of the sleeves and consequently the stability of the unit and a stack in which the unit is placed.

Figure 12:
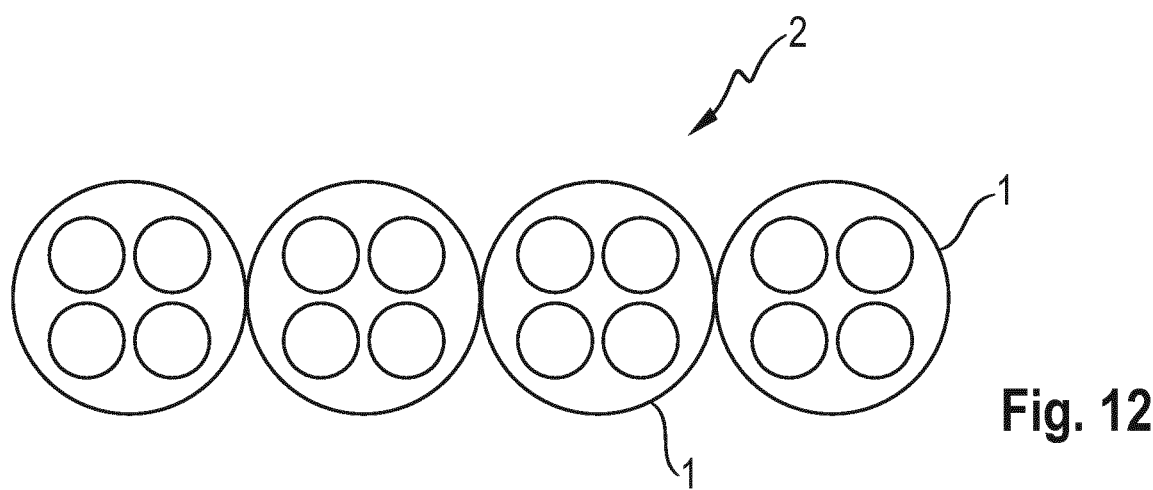
FIG. 12 shows schematically an embodiment of a system according to the invention.

FIG. 12 shows units 2, having sleeves 1 with each a plurality of lumen.

Figure 13:
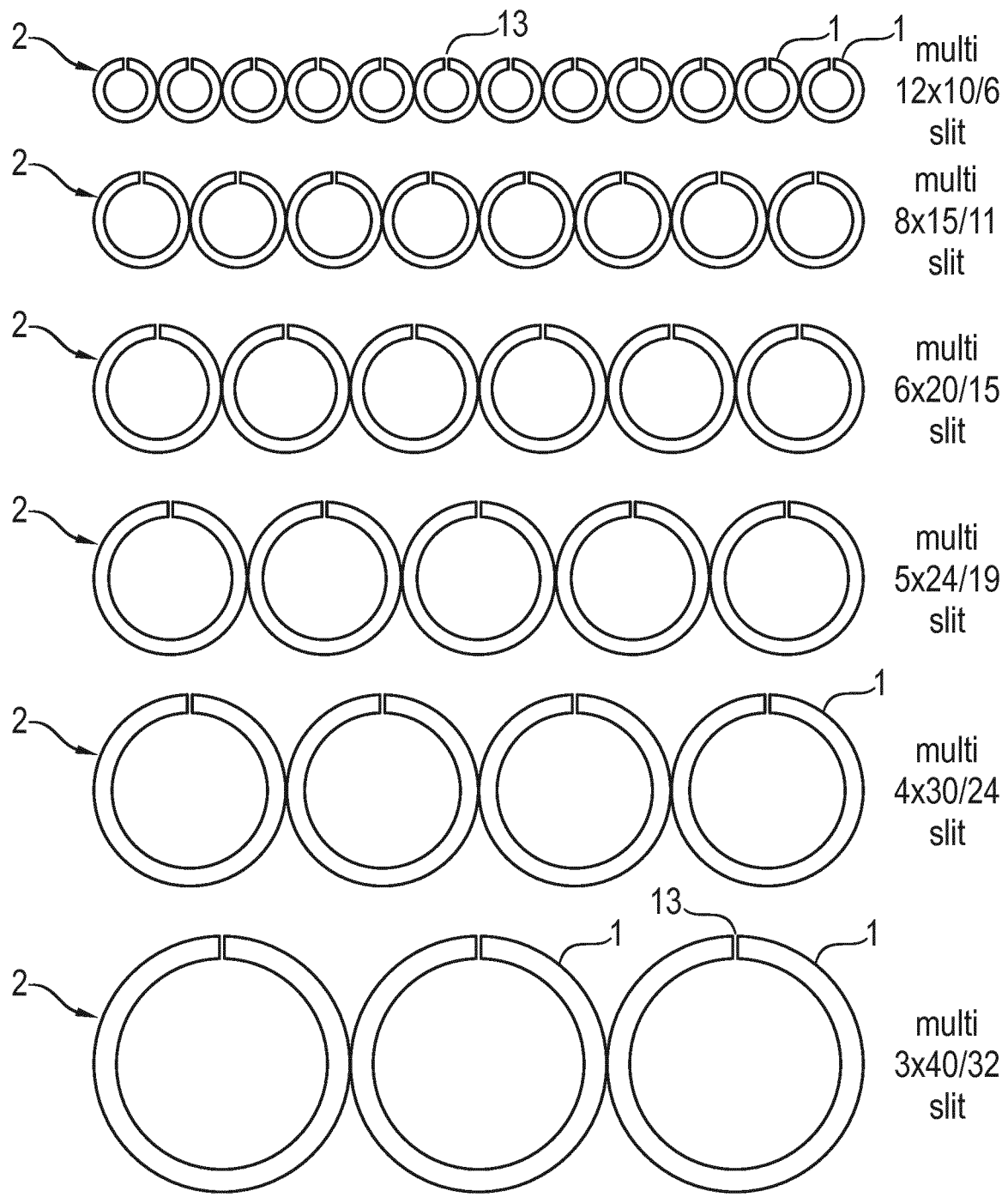
FIG. 13 shows schematically an embodiment of a system according to the invention.

FIG. 13 shows units 2, of which each sleeve 1 is provided with a slit 13, for allowing insertion in the respective sleeve a cable that already extends through a conduit.

Figure 14:
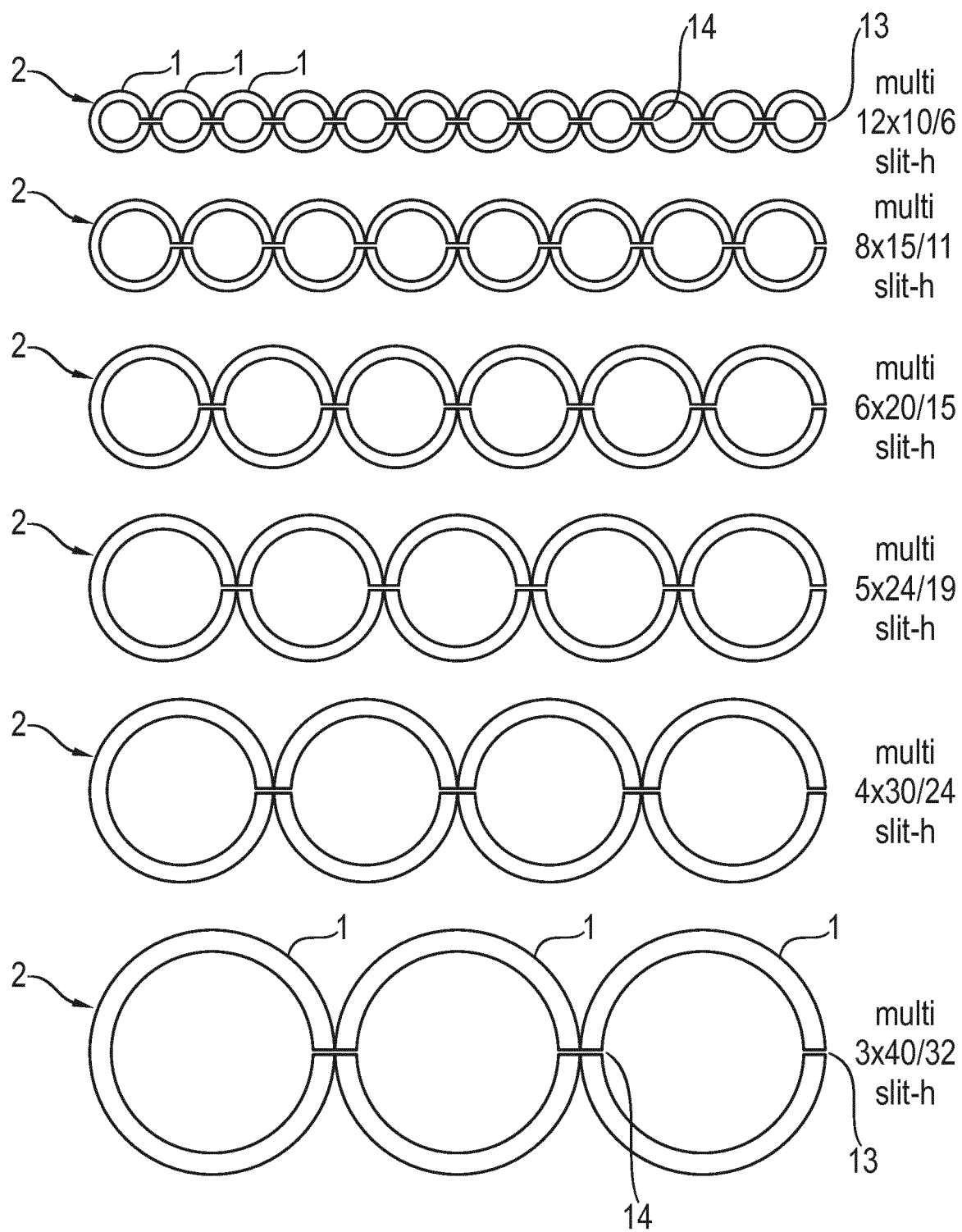
FIG. 14 shows schematically an embodiment of a system according to the invention.

FIG. 14 shows units 2, very much like the units shown in FIGS. 8a and 8b. FIG. 14 shows a number of units 2, having mutually different dimensions due to the different inner and outer diameters of the sleeves 1.

Figure 15:
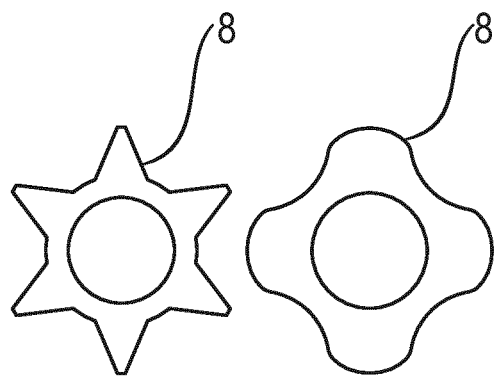
FIG. 15 shows schematically a part of an embodiment of a system according to the invention.

FIG. 15 shows another example of a single sleeve 8, having a star-shaped cross-section, suitable for insertion in a sleeve through which for the moment no cable extends. The single sleeve 8 provides strength to that sleeve 1 of the unit 2.

Figure 16:
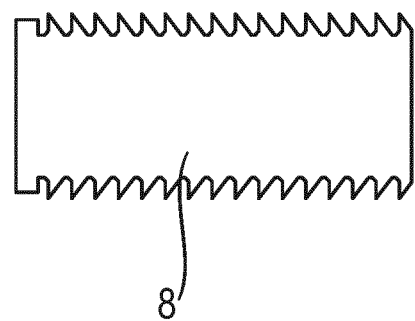
FIG. 16 shows schematically a part of an embodiment of a system according to the invention.

FIG. 16 shows a single sleeve viewed from a side, i.e. not viewed along its axis. The sleeve is provided with a number of external ribs separated in axial direction for self-fixation within a confinement having a dimension that allows for such self-fixating of that sleeve.

Figure 17:
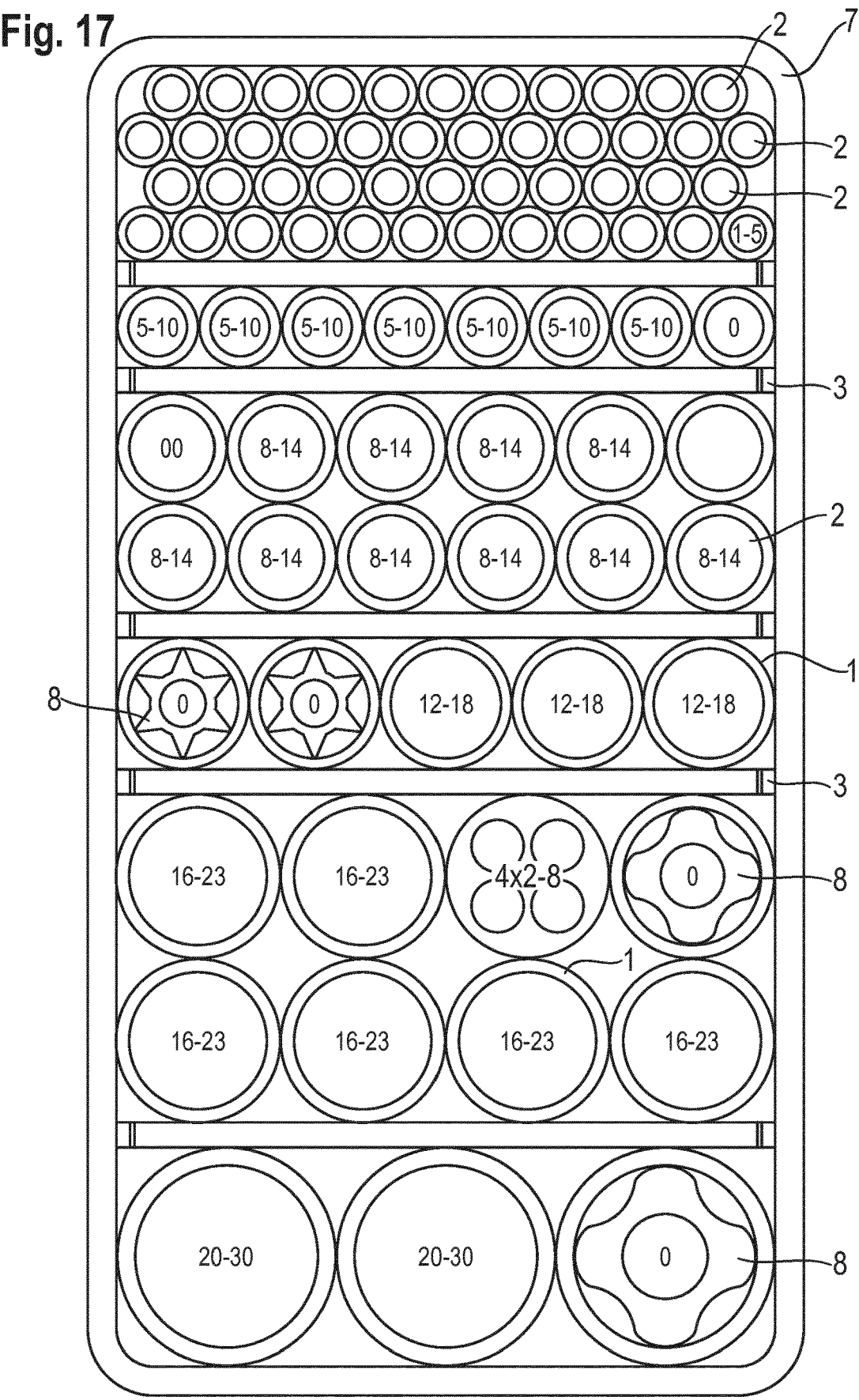
FIG. 17 shows schematically an embodiment of a system according to the invention.

FIG. 17 shows a conduit 7 in which an embodiment of a system according to the invention has been installed.

Figure 18:
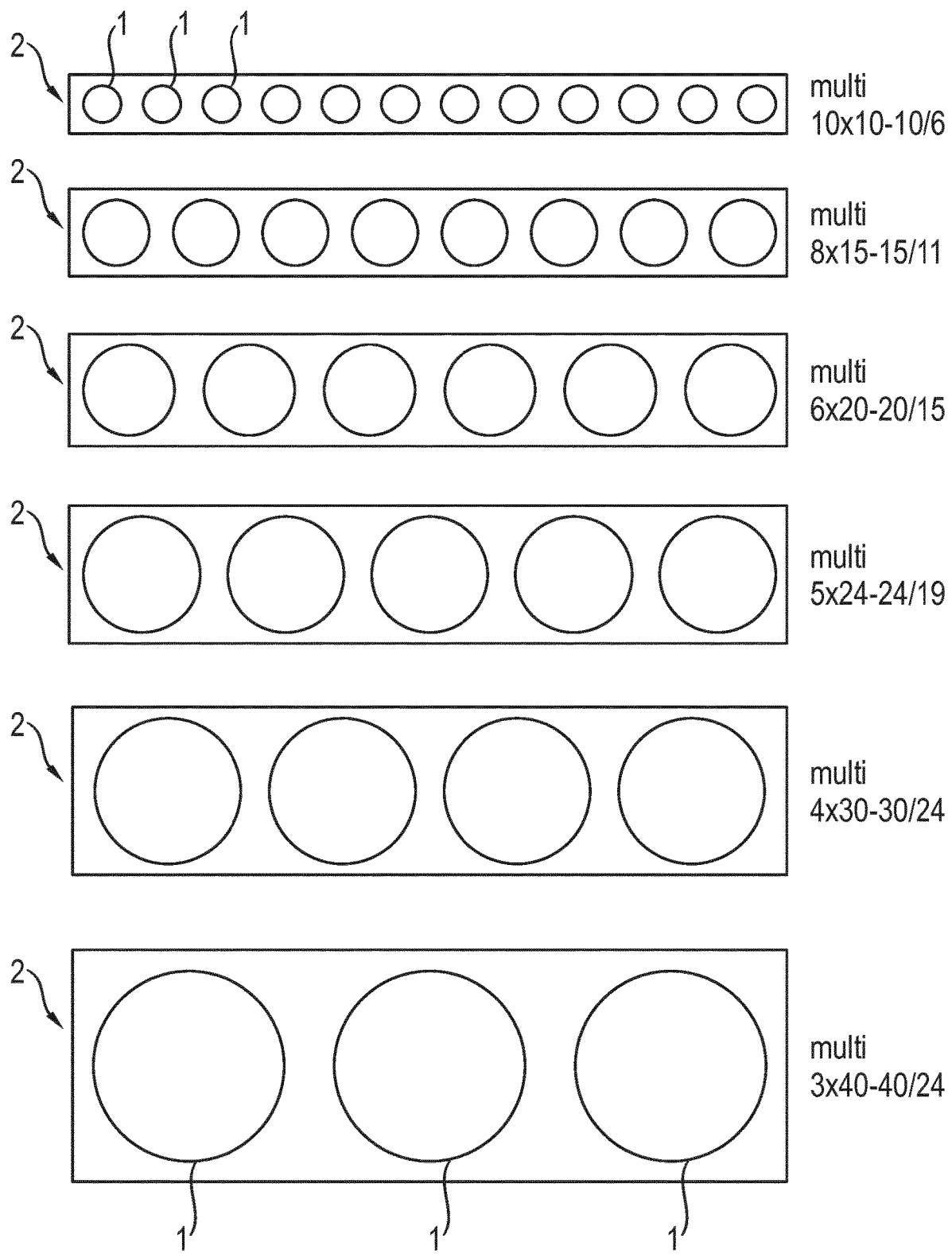
FIG. 18 shows schematically a part of an embodiment of a system according to the invention.

FIG. 18 shows units having a block-shaped outer shape, i.e. of which the sleeves have a block-shaped cross-section.

Figure 19:
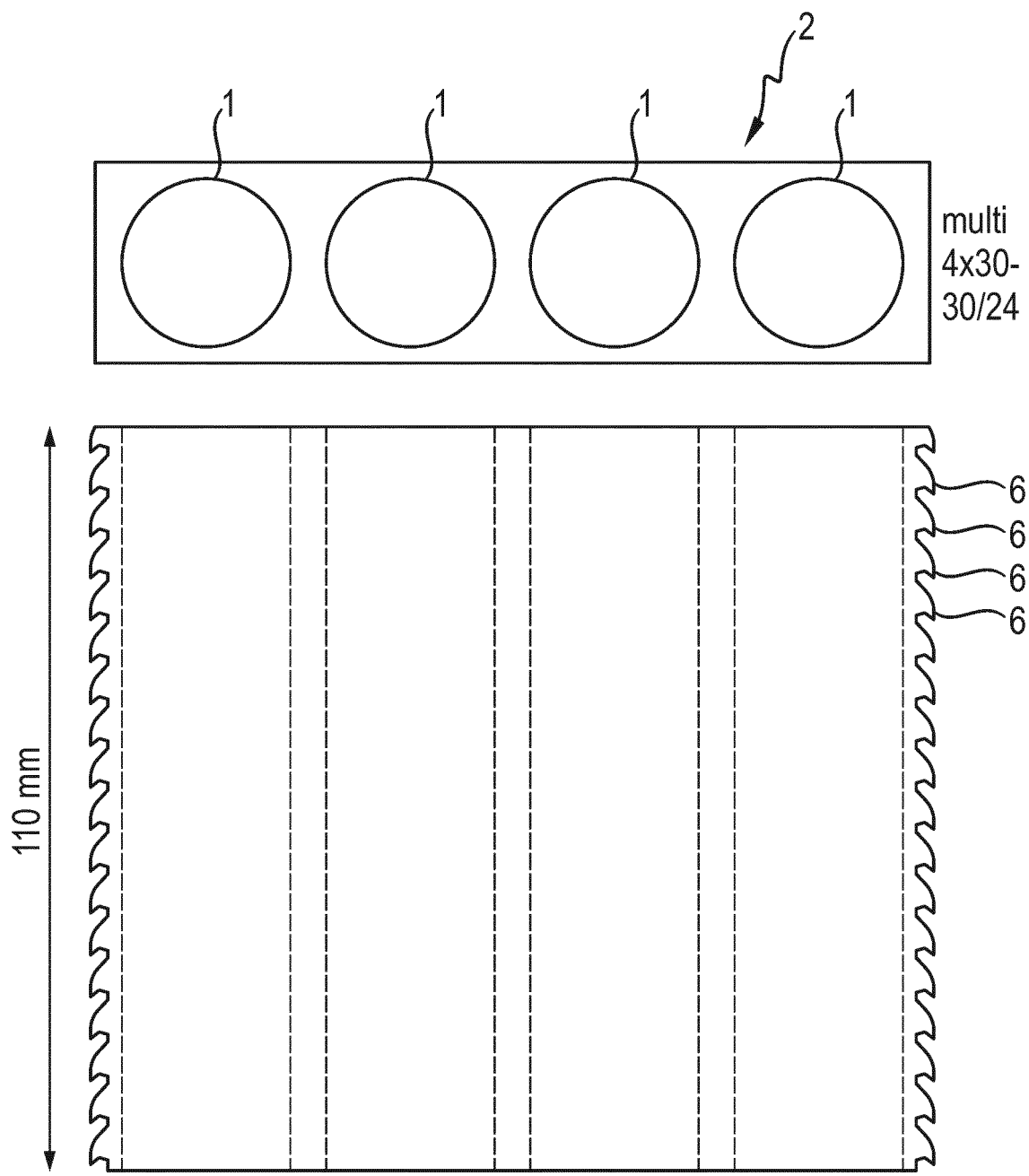
FIG. 19 shows schematically a a part of an embodiment of a system according to the invention.

FIG. 19 shows an embodiment similar to the one shown in FIG. 18. However, the parts of the unit which are likely to face an inner side of a conduit are provided with a number of external ribs separated in axial direction for self-fixation itself within a confinement having a dimension that allows for such self-fixating.

Figure 20:
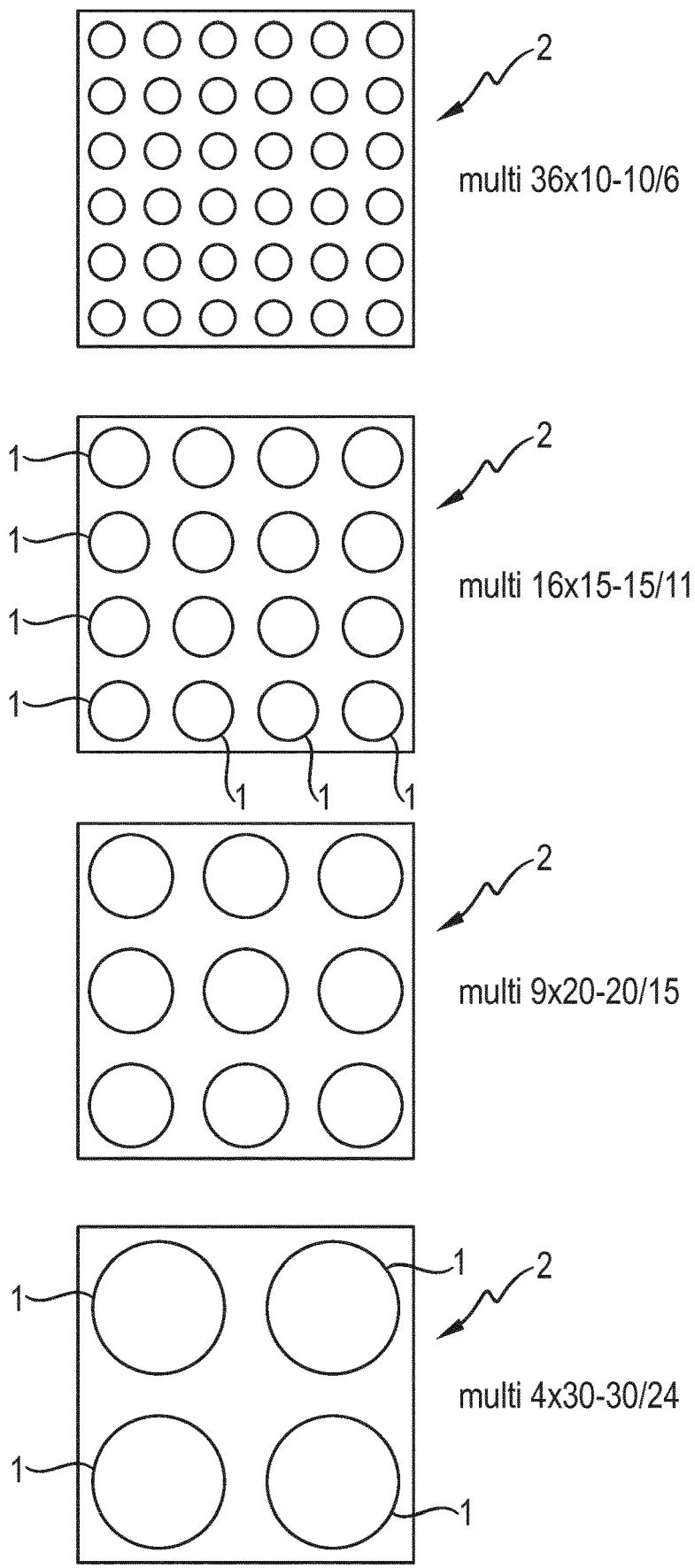
FIG. 20 shows schematically a part of an embodiment of a system according to the invention.

FIG. 20 shows units 2, having more than one layer of sleeves, and having a block-shaped outer shape.

Figure 21:
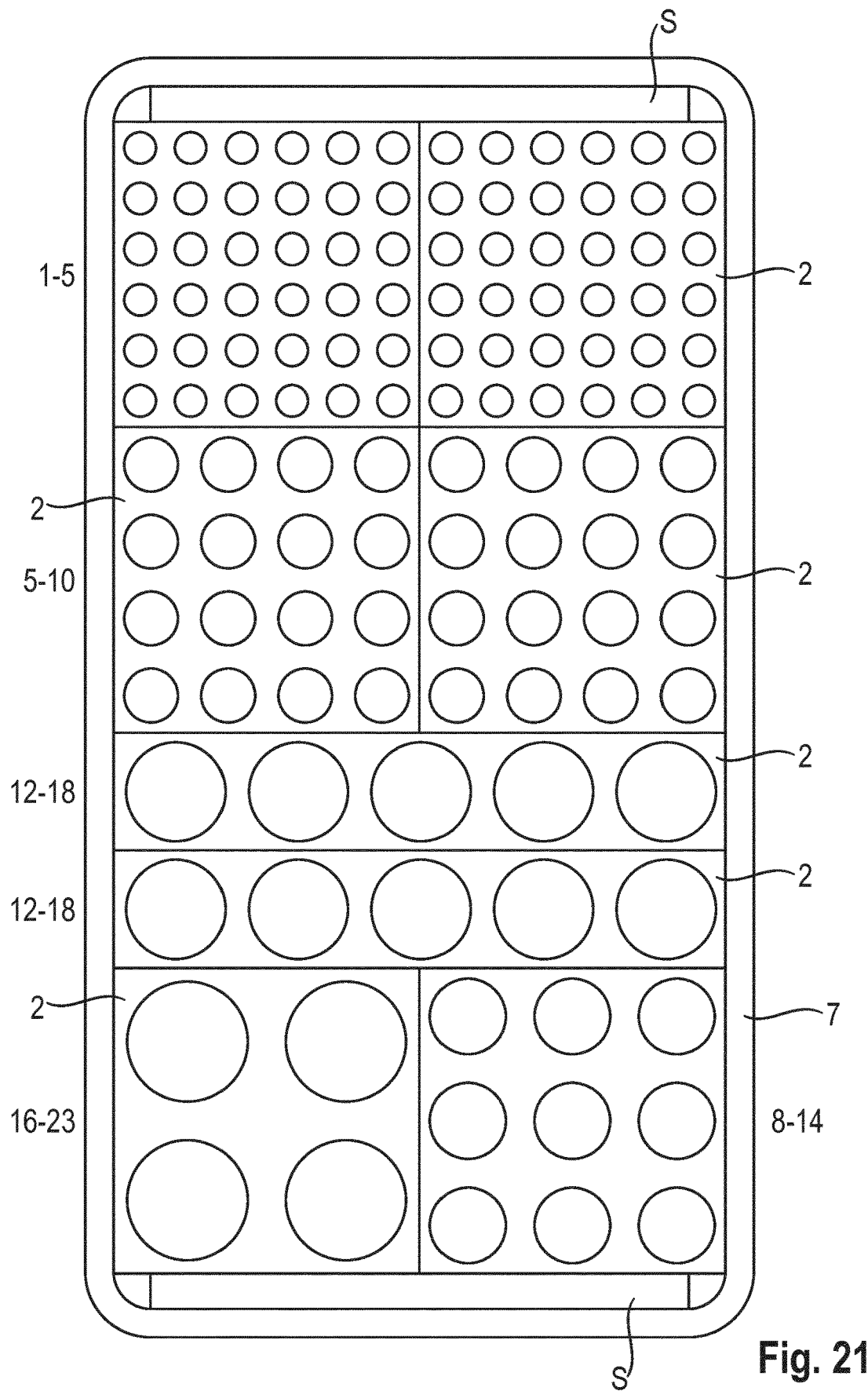
FIG. 21 shows schematically an embodiment of a system according to the invention.
Figure 22:
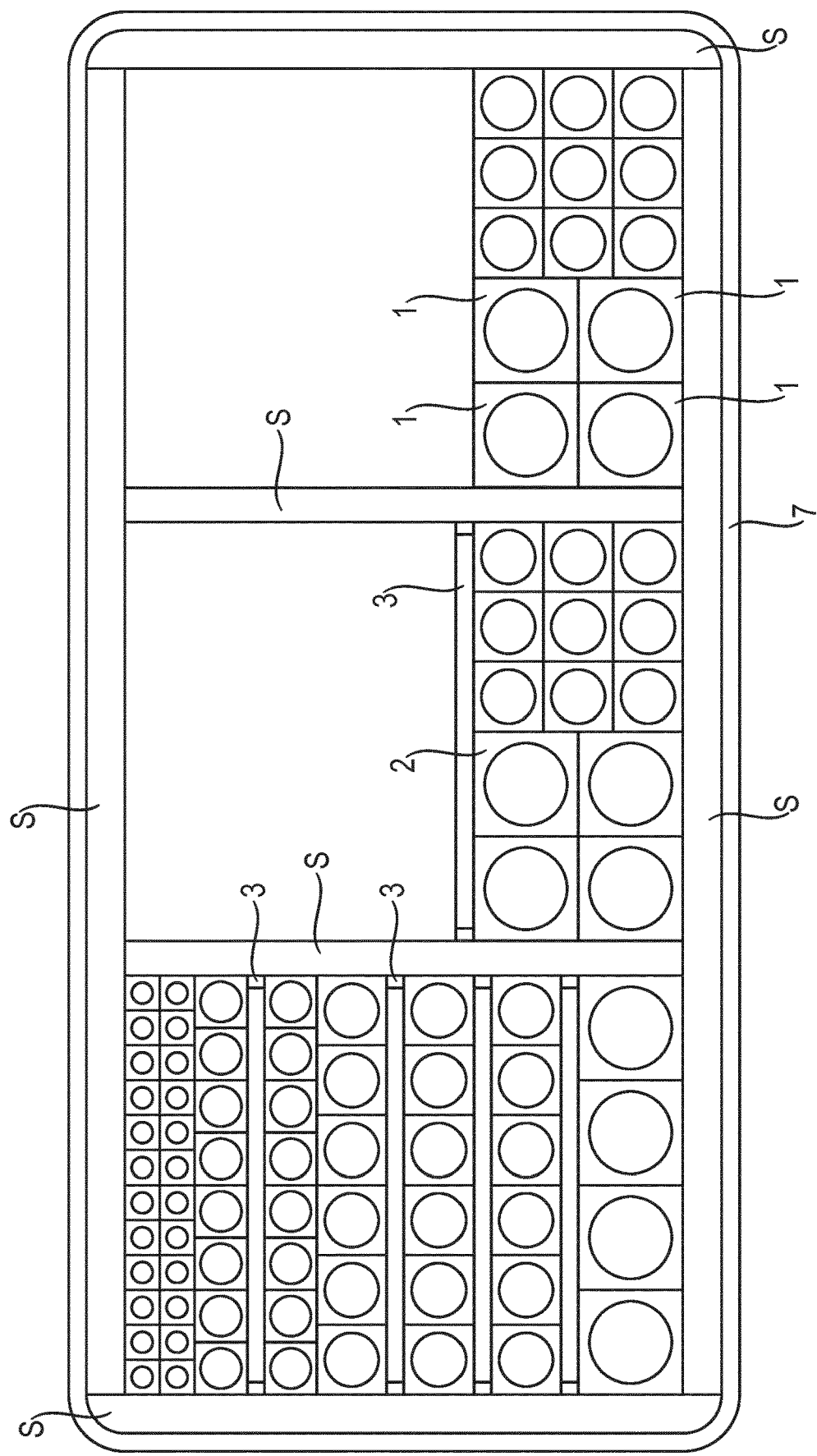
FIG. 22 shows schematically an embodiment of a system according to the invention.

FIG. 21 and FIG. 22 show embodiments of a system according to the invention having spacers S for fixating the units 2 within a conduit 7. These spacers are also of a rubbery or rubber-like material, with a hardness different from the hardness of the material of units. The spacers may, or may not, be provided with ribs.

As indicated earlier on, for a sealing off, ideally a sealant is applied as also shown in FIGS. 9 and 10, for instance referred to in WO 08104237 A1.

The invention is not limited by the embodiments shown. Many modifications are possible. The rubbery or rubber-like material is preferably of a fire resistant grade. However, it is also possible to have a material that is purely very stable rubber, for instance for applications in which the system has to withstand exposure to water, under low or relatively high pressure. Further, within one layer of a stack of units, different units having different diameters of the sleeves 1, may be applied, provided that stacking of the units into a rectangular shape is still possible. In case the sleeves 1 and the plates 3 are made of a thermally expandable rubber-like material it may be provided in a color that differs from black or grey, to ensure that no mixing will occur with sleeves 1 and/or units provided by a different supplier. Such mixing could lead to undesired inaccurate recordability of the position of the sleeves 1 and cables 12, as well as a disfunctioning under catastrophic circumstances. The system is flexible in terms of the number of cables and the size of cables that need to extend through the conduit 7 and the system. This system can also be used for conduits 7 through which bundles of relatively thin cables, tie-wrapped together, need to extend.

The following applies to each of the embodiments:

Each sleeve is preferably free from peelable inner layers, so the inner diameter is preferably pre-fixed.

The units can be made by injection molding, preferably even by one shot, and in any case as a single part entity.

Ideally, each of the units has between each inner diameter of the sleeves and outer dimensions of the unit a continuous and constant material structure. Each unit preferably is made of a rubbery or rubber-like material having a hardness in the range of 68 to 76 Shore A.

The material is preferably silicon based, and ideally homogenous.

Each sleeve is preferably free from sealing properties for cables.

Use of a system according to the invention may comprise:
providing the system in a conduit such that the stack of units is made;
pulling a cable through a number of sleeves in the stack so that a number of cables is held in the conduit, each cable having its own sleeve, and each cable having an outer diameter that is smaller than an inner diameter of the sleeve in which the respective cable is then held.

The use may further comprise providing a layer of sealant against the stack at ends of the sleeves, so as to seal off unoccupied space in the sleeves.

A system according to the invention may further be configured so as to have the units placed in a stack of units in a conduit and so as to have a cable extending through a number of sleeves, therewith holding a number of cables in the conduit, each cable having its own sleeve, and each cable having an outer diameter that is smaller than an inner diameter of the sleeve in which the respective cable is held.

Such a system may further be provided with a layer of sealant against the stack of units at ends of the sleeves, so as to seal off unoccupied space in the sleeves.

The invention claimed is:

1. A system for holding in a conduit cables and/or ducts with different diameters, comprising first and second units configured for insertion in a conduit, the conduit having a top wall, bottom wall, first side wall, and second side wall fixed relative to one another, wherein at least one of the top wall and the bottom wall is configured to contact the first unit, the first and second units each comprising a plurality of rubbery or rubber-like sleeves that are oriented parallel to each other, each sleeve being integrally formed and having a continuous lumen with a diameter, wherein the first and second units each has an outer shape that is block-shaped, wherein the block-shaped outer shape has a constant cross section taken along a direction perpendicular to a direction of each lumen, wherein the first unit has a sleeve having a lumen with a diameter which differs from a diameter of a lumen of a sleeve of the second unit, wherein each lumen is free from annular sealing rings and is configured to facilitate sliding of sheathed cables through each lumen, and wherein the first and second units are dimensioned such that the first unit and the second unit can form a stack of units in a vertical direction where the sleeves of the first unit and the second unit are oriented parallel to each of the other sleeves.

2. The system according to claim 1, wherein in each unit, the lengths of the sleeves correspond to each other.

3. The system according to claim 1, comprising at least one unit of which the sleeves are all positioned in one layer.

4. The system according to claim 3, wherein each unit has, apart from the height of the one layer, dimensions which correspond to the dimensions of any of the other units.

5. The system according to claim 1, comprising at least one unit having layers of sleeves.

6. The system according to claim 1, wherein the lumens of the sleeves of the first unit have the same diameter.

7. The system according to claim 1, wherein the block-shaped outer shape comprises a flat surface which extends in a length direction of the sleeves and which extends in a layer direction of the sleeves in the respective unit.

8. The system according to claim 1, wherein the system also comprises at least one single sleeve, having an outer cross-sectional dimension for inserting at least one of these single sleeves in another sleeve of the system.

9. The system according to claim 8, wherein the at least one single sleeve is provided with multiple lumens.

10. The system according to claim 8, wherein the single sleeve is provided with a number of external ribs separated in axial direction for self-fixation of the single sleeve within a confinement having a dimension that allows for such self-fixating.

11. The system according to claim 8, the at least one single sleeve having a block-shaped, a star-shaped or a circular cross-section.

12. The system according to claim 8, wherein the sleeves are made of a vulcanized thermally substantially un-expandable rubbery material.

13. The system according to claim 1, wherein the sleeves are made of a thermally expandable rubber-like material.

14. The system according to claim 1, wherein at least a part of an outer part of at least one unit is provided with ribs for facilitating insertion of the unit in a conduit and for facilitating positioning the unit in a self-fixating fashion.

15. The system according to claim 1, wherein the system is free from any wedge-shaped parts for inserting in the conduit and contributing to a clamping of the units.

16. The system according to claim 1, wherein the system is free from a controllable mechanism for putting the units under an enhanced pressure after installing the units in a conduit.

17. The system according to claim 1, further comprising a conduit into which the stack of units can be assembled such that it snugly fits in the conduit.

18. The system according to claim 1, further comprising a sealant for application against the stack of units at ends of the sleeves when the stack is completed in a conduit and cables are held by a number of the sleeves.

19. The system according to claim 1, wherein each of the first and second units is made of a homogeneous material.

20. The system according to claim 1, wherein each of the first and second units is integrally formed such that the plurality of sleeves of each unit are combined to form a single integrally formed component.

21. The system according to claim 1, wherein each sleeve is free from peelable inner layers.

22. The system according to claim 1, wherein each unit is made of a rubbery or rubber-like material having a hardness in the range of 68 to 76 Shore A.

23. The system according to claim 1, wherein the block-shaped outer shape is a rectangular prism.

24. The system according to claim 23, wherein the block shaped outer shape has only six sides.

25. The system according to claim 1, wherein the top wall, bottom wall, first side wall, and second side wall are free from compression.

\* \* \* \* \*